(12) United States Patent
Farnam

(10) Patent No.: US 9,164,293 B2
(45) Date of Patent: Oct. 20, 2015

(54) ADJUSTABLE EYEWEAR WITH FIXED TEMPLE AND METHOD OF MANUFACTURE

(71) Applicant: Dolby Laboratories Licensing Corporation, San Francisco, CA (US)

(72) Inventor: Julian Farnam, Livermore, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 117 days.

(21) Appl. No.: 13/658,703

(22) Filed: Oct. 23, 2012

(65) Prior Publication Data

US 2013/0100397 A1  Apr. 25, 2013

Related U.S. Application Data

(60) Provisional application No. 61/550,820, filed on Oct. 24, 2011.

(51) Int. Cl.
*G02C 5/20* (2006.01)

(52) U.S. Cl.
CPC ........................................ *G02C 5/20* (2013.01)

(58) Field of Classification Search
CPC .............. G02C 5/14–5/20; G02C 5/22–5/229; G02C 5/2263
USPC ........................................... 351/41, 111–123
See application file for complete search history.

(56) References Cited

U.S. PATENT DOCUMENTS

| 3,261,652 | A | 7/1966 | Magnus |
| 3,612,668 | A | 10/1971 | Watkins |
| 3,874,775 | A | 4/1975 | Lazarus |
| 4,544,245 | A | 10/1985 | Stansbury, Jr. |
| 4,848,891 | A | 7/1989 | Lee |
| 5,347,325 | A | 9/1994 | Lei |
| 5,426,473 | A | 6/1995 | Riehm |
| 5,532,767 | A | 7/1996 | Pleune |
| 5,796,461 | A | 8/1998 | Stepan |
| 5,812,234 | A | 9/1998 | Carswell |
| 5,870,165 | A | 2/1999 | Wang |
| 5,909,267 | A | 6/1999 | Hall |
| 6,290,356 | B1 | 9/2001 | Chi |
| 6,318,858 | B1 | 11/2001 | Siani |
| 6,332,681 | B1 | 12/2001 | Li |
| 6,454,406 | B1 | 9/2002 | Guo |
| 6,474,813 | B1 | 11/2002 | Yeh |

(Continued)

FOREIGN PATENT DOCUMENTS

| CN | 2153070 | 1/1994 |
| CN | 101393323 | 3/2009 |

(Continued)

OTHER PUBLICATIONS

FR2652168A1 EPO Translation.*

(Continued)

*Primary Examiner* — Gary O'Neill

(57) ABSTRACT

A novel pair of eyewear includes a frame, one or more optically active eyepieces, a first temple piece and a second temple piece. The first and second temple pieces each include an adjustment mechanism for adjusting the length and angle of the first and second temple pieces. In a particular embodiment, the first and second temple pieces each include a locking mechanism for fixing the length and angle of the first and second temple pieces with respect to the frame.

31 Claims, 22 Drawing Sheets

(56) References Cited

U.S. PATENT DOCUMENTS

| | | |
|---|---|---|
| 6,491,389 B2 | 12/2002 | Yaguchi |
| 6,511,177 B1 | 1/2003 | Hall |
| 6,588,895 B2 | 7/2003 | Pointet |
| 6,618,901 B1 | 9/2003 | Wan Lee |
| 6,776,483 B1 | 8/2004 | Wu |
| 6,883,914 B1 | 4/2005 | Yang |
| 7,300,150 B1 | 11/2007 | Chen |
| 7,520,606 B2 | 4/2009 | Hogen |
| 2002/0047985 A1 | 4/2002 | Hollins |
| 2006/0221297 A1 | 10/2006 | Tsai |
| 2006/0221299 A1 | 10/2006 | Wang-Lee |
| 2007/0030441 A1 | 2/2007 | Hsiung |
| 2008/0284975 A1* | 11/2008 | Negishi et al. ................ 351/118 |
| 2010/0060857 A1 | 3/2010 | Richards |
| 2011/0286093 A1* | 11/2011 | Bittner .......................... 359/466 |

FOREIGN PATENT DOCUMENTS

| | | | |
|---|---|---|---|
| FR | 2652168 A1 * | 3/1991 | ............... G02C 5/20 |
| JP | 20030215505 | 7/2003 | |
| WO | 9423328 | 10/1994 | |
| WO | 9908146 | 2/1999 | |

OTHER PUBLICATIONS

C02 Laser Eyewear: Adjustable Temple Lengths.

3M Virtua Protective Eyewear V5, 11677-00000-20 Black Adjustable Temple.

Sperian Op-Tema.

Eyewear Adjustable Temple Maxim Black Frame Indoor/Outdoor Lens DX Coating.

* cited by examiner

ADJUSTABLE EYEWEAR WITH FIXED TEMPLE AND METHOD OF MANUFACTURE

CROSS REFERENCE TO RELATED APPLICATIONS

This Application claims the benefit of priority to related, Provisional U.S. Patent Application No. 61/550,820 filed on 24 Oct. 2011 entitled "Eyewear with Adjustable Temple and Method of Manufacture" by Julian T. Farnam, hereby incorporated by reference in its entirety.

BACKGROUND OF THE INVENTION

1. Field of the Invention

This invention relates generally to eyewear, and more particularly to eyewear having adjustable temple pieces. Even more particularly, this invention relates to eyewear in which both the length and the angle of the temple pieces are adjustable. Even more particularly, this invention relates to fixed-temple eyewear in which both the length and the angle of the temple pieces are adjustable.

2. Description of the Background Art

Some modern video presentations (e.g., 3-D movies) require special eyewear to be viewed properly, and the comfort of the eyewear is important for full enjoyment of the video presentation. In order to provide the correct visual experience, the eyewear must fit the wearer properly. In addition, poorly fitting eyewear can be a distraction to the wearer and, therefore, interfere with the wearer's enjoyment of the video presentation.

The problems associated with poorly fitting eyewear are even worse when the eyewear is of the fixed-temple type. In fixed-temple eyewear, each temple piece is fixed in position relative to the frame of the eyewear. In contrast, other types of eyewear include temple pieces that are pivotally connected to the frame by, for example, a hinge pin.

Theaters typically provide eyewear for patrons when showing 3-D movies. A range of sizes is required to provide every potential viewer with properly fitting eyewear. Of course, adult viewers are of a wide variety of sizes. In addition, some audiences include a mixture of adults and children. In that case, at a minimum, the theater must provide both adult and child sized glasses. Optimally, a wide variety of sizes would be provided to ensure the best fit for each viewer.

The need for a variety of different size glasses requires theaters to stock a greater quantity of glasses at a greater cost to the theater. In addition, providing glasses of various sizes also makes distribution before a video presentation more complicated. What is needed, therefore, is eyewear that can properly fit a wide range of different sized viewers, and that is comfortable and functional for all of the viewers, regardless of their size.

Adjustment mechanisms for eyewear are known in the art. For example, U.S. Pat. No. 3,874,775 issued to Lazarus and U.S. Pat. No. 4,848,891 issued to Lee, each discloses an eyeglass frame in which the wearer can easily adjust the pressure exerted on the head by the temple pieces. While both inventions provide an adjustment mechanism to provide some comfort to wearers of different sizes, the solutions are not completely satisfactory. Adjusting the pressure exerted by the temple pieces cannot provide a truly comfortable fit, if the lengths of the temple pieces are not properly sized for the wearer.

U.S. Pat. No. 5,426,473, issued to Riehm, discloses an eyeglass frame in which the temples are adjustable, by changing the point of pivotal attachment to the frame. Adjustments of the pivot points cause the temple pieces to move slightly forward and backward, and also to move slightly toward and away from each other. However, Riehm still does not fully address the problem of adjusting a single pair of eyewear to fit a variety of different sized wearers. Rather, the adjustment mechanism appears to provide only fine adjustment. In addition, the adjustment of the temple pieces in Riehm does not adjust the angle of the temple pieces.

U.S. Published Patent Application No. 2002/0047985 A1, by Hollins, discloses a frame in which both the temple angle and the length of the temple pieces are adjustable. However, the adjustment mechanisms are separate and require separate adjustment. Additionally, providing multiple adjustment mechanisms is generally more complicated and more costly to manufacture.

What is needed, therefore, is eyewear that can properly fit a wide range of different sized viewers, and that is comfortable and functional for all of the viewers, regardless of their size. What is also needed is eyewear that requires a minimal number of adjustment mechanisms. What is also needed is eyewear that has a minimal number of components and is less expensive to manufacture. What is also needed is eyewear that is easy to assemble. What is also needed is eyewear that is easily adjustable by an adult or child. What is also needed is eyewear that is easily adjustable without the use of tools. What is also needed is fixed-temple eyewear that provides some or all of the foregoing advantages.

SUMMARY

The present invention overcomes the problems associated with the prior art by providing adjustable eyewear, which is of the fixed-temple type yet facilitates both length and angle adjustment, and a method for manufacturing the adjustable eyewear.

In an example embodiment, the adjustable eyewear includes a frame, at least one optically actively eyepiece, a first temple piece, and a second temple piece. The frame includes a first side and a second side. The optically active eyepiece is mounted to the frame and includes a front surface and a rear surface. The first temple piece is coupled to the first side of the frame, has a length, and includes a first adjustment mechanism. The first adjustment mechanism is capable of adjusting both the length of the first temple piece and an angle of the first temple piece with respect to a line extending between the first side of the frame and the second side of the frame. The second temple piece is coupled to the second side of the frame, has a length, and includes a second adjustment mechanism. The second adjustment mechanism is capable of adjusting both the length of the second temple piece and an angle of the second temple piece with respect to the line extending between the first side of the frame and the second side of the frame.

In a more particular embodiment, each of the first temple piece and the second temple piece includes a first temple portion and a second temple portion. The first temple portion is rigidly affixed to the frame and extends away from the line extending between the first side of the frame and the second side of the frame. Likewise, the second temple portion is rigidly affixed to the frame and extends away from the line extending between the first side of the frame and the second side of the frame. Sliding the second temple portions with respect to the first temple portions facilitates adjusting the length of the temple pieces. In the example embodiments, the first temple portions are formed integrally with the frame.

In another more particular embodiment, the adjustment mechanism includes an angle adjustment device and a complementary angle adjustment device. The angle adjustment device is formed on one of the first temple portion and the second temple portion. The complementary angle adjustment device is formed on the other of the first temple portion and the second temple portion. Sliding the second temple portion with respect to the first temple portion facilitates adjustment of the angle of the temple piece with respect to the line extending between the first side of the frame and the second side of the frame.

In one even more particular example embodiment, the angle adjustment device defines at least one channel and the complementary angle adjustment device includes at least one projection extending into said channel. When the second temple portion is moved with respect to the first temple portion, the projection moves within the channel. As the projection moves within the channel, the angle between the second temple portion and the line extending between the first side of the frame and the second side of the frame changes.

In an alternative example embodiment, the angle adjustment device includes a ramp and the complementary angle adjustment device includes a ramp engaging structure disposed to abut the ramp. Sliding the second temple portion with respect to first temple portion causes the ramp engaging structure to move along the ramp, thereby changing the angle between the second temple portion and the line extending between the first side of the frame and the second side of the frame.

In another more particular embodiment, adjustment mechanism includes a linking member coupled between the first temple portion and the second temple portion. Sliding the second temple portion with respect to the first temple portion changes the angle between the second temple portion and the line extending between the first side of said frame and the second side of the frame. In a specific example, the linking member includes a rigid, elongated piece having a first end pivotally coupled to the first temple portion and a second end pivotally coupled to the second temple portion.

In some embodiments, the adjustable eyewear further includes a first locking mechanism and a second locking mechanism. The first locking mechanism is adapted to selectively lock the first temple piece into one of a plurality of discrete adjusted positions. Each of the adjusted positions is characterized by a unique temple piece length and a unique angle between a distal end of the temple piece and the line extending between the first and second sides of the frame. Likewise, the second locking mechanism is adapted to selectively lock the second temple piece into one of a plurality of discrete adjusted positions. Each of the adjusted positions is characterized by a unique second temple piece length and a unique angle between a distal end of the second temple piece and the line extending between the first and second sides of the frame. When the first temple piece and the second temple piece are each locked into a discrete adjusted position, the first temple piece and the second temple piece are fixed in position with respect to the frame.

Another disclosed embodiment of adjustable eyewear includes a frame having a first side and a second side, at least one optically active eyepiece mounted to the frame, a first temple piece, and a second temple piece. The eyepiece has a front surface and a rear surface. The first temple piece includes a first temple portion rigidly affixed to the first side of the frame and a second temple portion coupled to the first temple portion of the first temple piece. The first temple piece also includes an adjustment mechanism capable of adjusting an angle of the second temple portion with respect to a line extending between the first side of the frame and the second side of the frame. The second temple piece also includes a first temple portion rigidly affixed to the second side of said frame and a second temple portion coupled to the first temple portion of the second temple piece. The second temple piece also includes an adjustment mechanism capable of adjusting an angle of the second temple portion with respect to the line extending between the first side of the frame and the second side of the frame.

Methods for manufacturing adjustable eyewear are also disclosed. One method includes providing a frame having a first side and a second side, providing an eyepiece, mounting the eyepiece to the frame, providing a first temple piece, providing a second temple piece, coupling the first temple piece to the first side of the frame, and coupling the second temple piece to the second side of the frame. The first temple piece has a length and includes a first adjustment mechanism capable of adjusting both the length of the first temple piece and an angle of the first temple piece with respect to a line extending between the first side of the frame and the second side of the frame. Likewise, the second temple piece has a length and includes a second adjustment mechanism capable of adjusting both the length of the second temple piece and an angle of the second temple piece with respect to the line extending between the first side of the frame and the second side of the frame. Optionally, the step of providing the first temple portion rigidly affixed to the frame could include forming the first temple portion integrally with the frame.

In a particular example, the method further includes incorporating a first locking mechanism into the first temple piece and a second locking mechanism into the second temple piece. Each of the first and second locking mechanism is adapted to selectively lock a respective temple piece into one of a plurality of discrete adjusted positions. Each of the adjusted positions is characterized by a unique temple piece length and a unique angle between a distal end of the respective temple piece and the line extending between the first side of the frame and the second side of the frame.

In another example method, the step of providing the first temple piece including the first adjustment mechanism and the step of providing the second temple piece including the second adjustment mechanism each comprises providing a first temple portion rigidly affixed to the frame, providing a second temple portion adapted to engage the ear of a wearer, and slidably engaging the second temple portion with the first temple portion.

In a more particular method, the step of providing the first temple portion and the step of providing the second temple portion include incorporating an angle adjustment device in one of the first temple portion and the second temple portion and incorporating a complementary angle adjustment device in the other of the first temple portion and the second temple portion. In addition, the step of slidably engaging the second temple portion with the first temple portion engages the angle adjustment device with the complementary angle adjustment device. In a particular example, the step of incorporating the angle adjustment device includes incorporating at least one channel and the step of incorporating the complementary angle adjustment device includes incorporating at least one projection extending into the channel. In an alternative example, the step of incorporating the angle adjustment device includes incorporating a ramp and the step of incorporating the complementary angle adjustment device includes incorporating a ramp engaging structure disposed to abut the ramp.

In another more particular method, the step of providing the first temple piece with the first adjustment mechanism includes providing a linking member, connecting a first end of the linking member to the first temple portion of the first temple piece, and connecting a second end of the linking member to the second temple portion of the first temple piece.

BRIEF DESCRIPTION OF THE DRAWINGS

The present invention is described with reference to the following drawings, wherein like reference numbers denote substantially similar elements.

DETAILED DESCRIPTION

The present invention overcomes the problems associated with the prior art, by providing fixed-temple eyewear wherein the length and angle of its temple pieces are adjustable. In the following description, numerous specific details are set forth (e.g., hinge mechanisms, frame/lens shape, linkage types, etc.) in order to provide a thorough understanding of the invention. Those skilled in the art will recognize, however, that the invention may be practiced apart from these specific details. In other instances, details of well known eyewear manufacturing practices (e.g., frame molding, lens forming, etc.) and components have been omitted, so as not to unnecessarily obscure the present invention.

Eyewear according to the present invention can be used with the Spectral Separation method of 3D stereoscopic projection. More specifically, the present invention can be used in combination with the improved Spectral Separation system disclosed in U.S. Patent Application Publication No. 2010/0060857A1, which is incorporated herein by reference in its entirety. Spectral Separation provides separation at the projector by filtering the left and right eye spectrally. The system differs from anaglyph in that the filters for the left and right eye each pass a portion of the red, green, and blue spectrum, providing for a full color image. The band pass spectrum of the left eye filter is complementary to the band pass spectrum of the right eye filter. The eyewear includes filters with the same general spectral characteristics as are used in the projector. While this method provides a full color image, it requires color compensation to make the colors in the left and right eye match the colors that were present in the original image, and there is a small reduction in the color gamut compared to the gamut of the projector.

Figure 1:
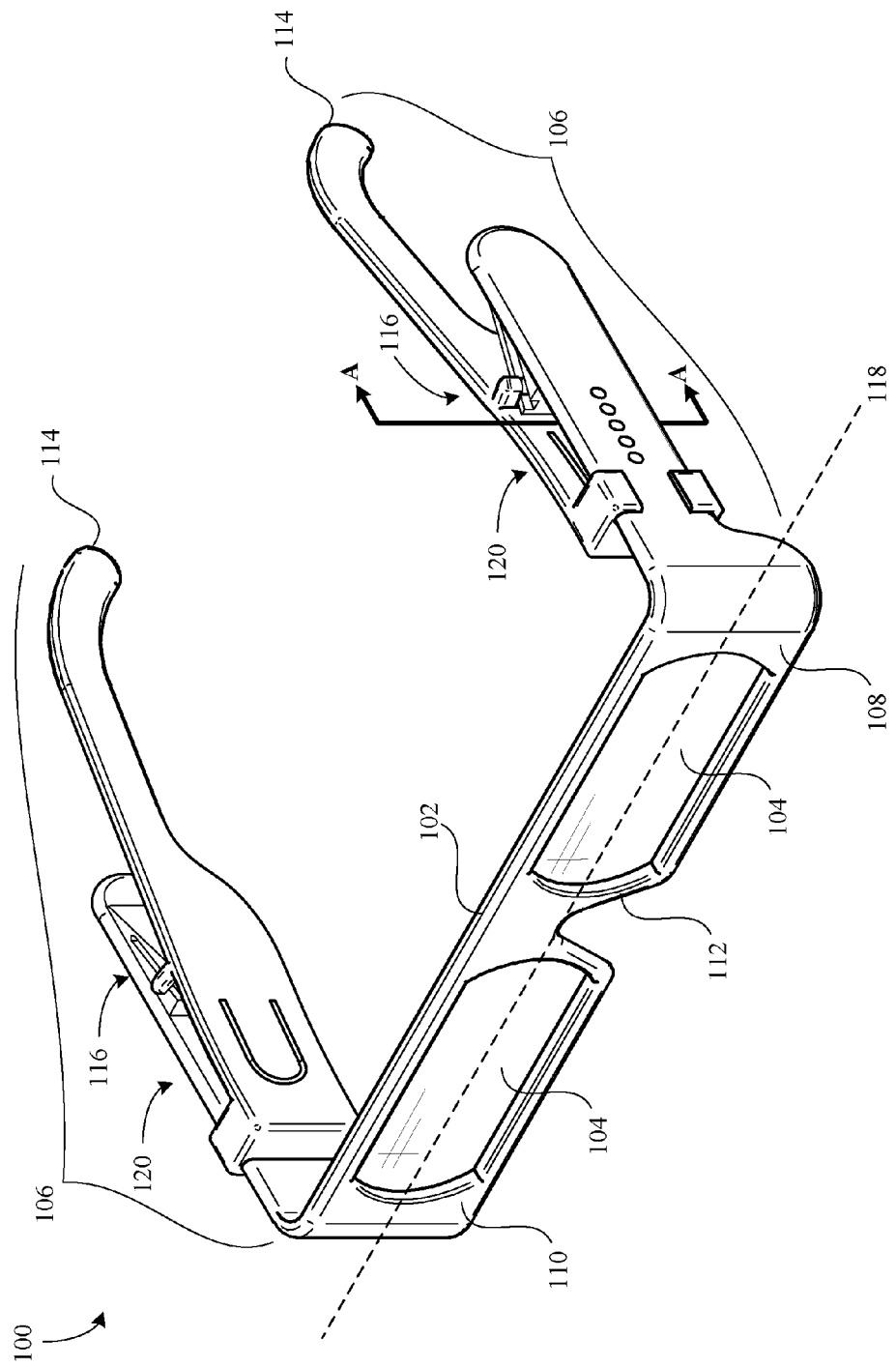
FIG. 1 is a front perspective view of eyewear with adjustable temple pieces according to one embodiment of the present invention.

FIG. 1 is a perspective view of a pair of eyewear 100 according to one embodiment of the present invention. Eyewear 100 includes a frame 102, a set of optically active eyepieces 104, and a set of adjustable temple pieces 106. Frame 102 includes a first side 108, a second side 110, and a bridge 112 formed therebetween. Bridge 112 is contoured to engage the bridge of a wearer's nose when eyewear 100 is worn. Each one of eyepieces 104 is mounted to a respective one of sides 108 and 110. Likewise, each one of temple pieces 106 is coupled to a respective one of sides 108 and 110 of frame. Furthermore, each of temple pieces 106 include a distal end 114 adapted (e.g., hooked) to engage the ears of the wearer so as to prevent eyewear 100 from slipping forward and down the wearer's nose.

Although eyewear 100 is essentially of the "fixed temple" type of eyewear, temple pieces 106 are adjustable. In particular, each temple piece 106 includes an adjustment mechanism 116, which facilitate the adjustment of both the length and angle of temple pieces 106 with respect to frame 102. It is important to understand that the length and angle of temple pieces 106 with respect to frame 102 are both important aspects of the present invention and are, therefore, concisely defined with reference to a line 118 extending symmetrically between first side 108 and second side 110 of frame 102. More specifically, the length of a temple piece 106 is defined as the distance between its distal end 114 and line 118. Furthermore, the angle of a temple piece 106 is defined as the angle of temple piece 106 with respect to line 118.

In addition to adjustment mechanism 116, each temple piece 106 also includes a locking mechanism 120 that selectively locks it into one of a plurality of discrete adjusted positions. Once locked into an adjusted position, the length and angular orientation of temple pieces 106 are fixed with respect to frame 102. Each of these discrete positions is characterized by a unique temple piece length and a unique temple piece angle.

Figure 2:
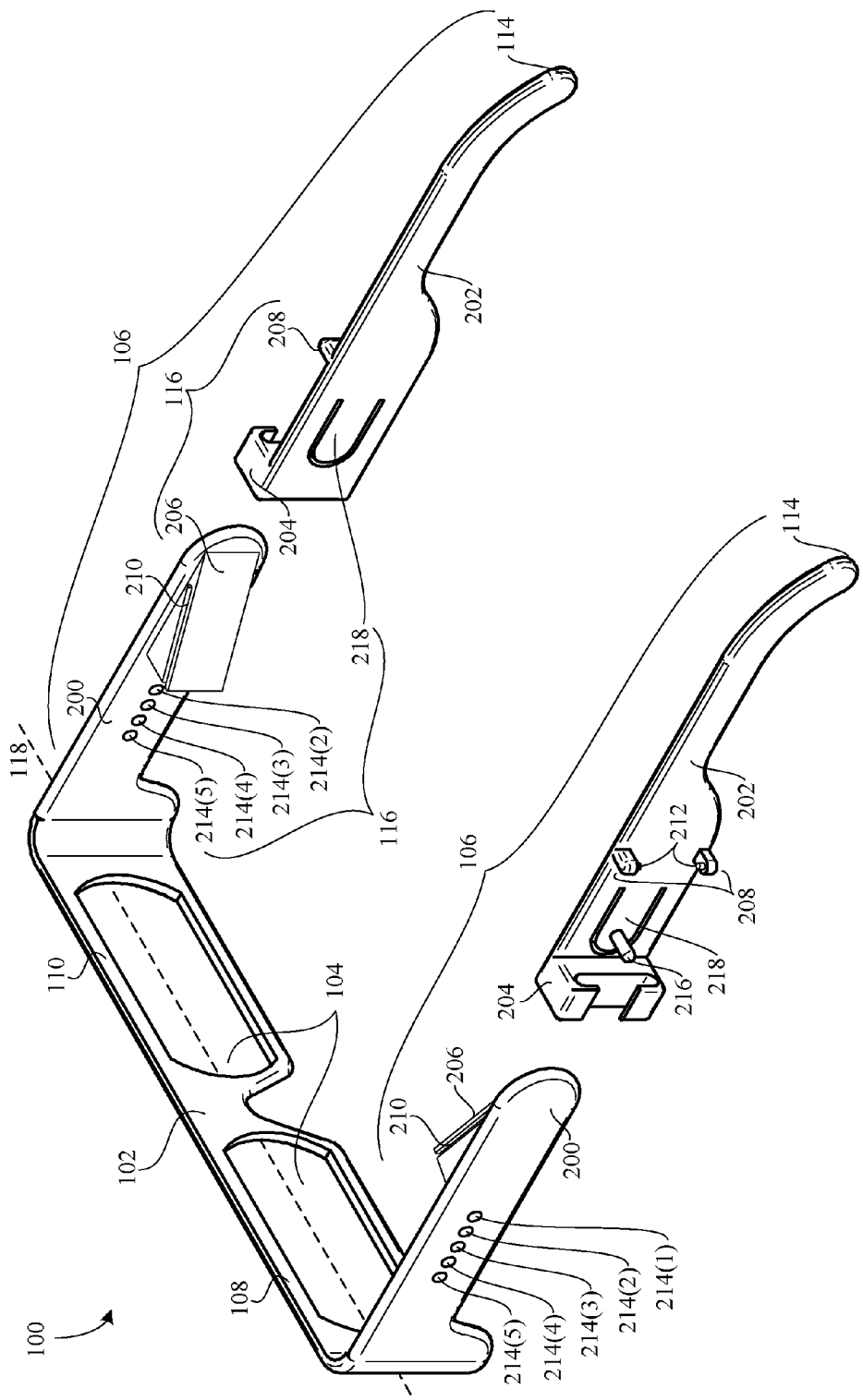
FIG. 2 is a rear perspective view of the eyewear of FIG. 1 disassembled.

FIG. 2 is a rear perspective view of eyewear 100 wherein temple pieces 106 are shown disassembled. Each of temple pieces 106 includes a first temple portion 200 and a second temple portion 202. In the example embodiment, first temple portions 200 are formed integrally with frame 102 and extend away from line 118. As shown, each of second temple portions 202 includes a guide feature 204 that is adapted to slidably engage the upper and opposite lower edges of first temple piece 200. The sliding of second temple portions 202 along first temple portions 200 facilitates adjusting the lengths (i.e. distance between distal ends 114 and frame 102) of temple pieces 106 according to wearer preference. That is, the length of temple pieces 106 are shortened by sliding second temple portions 202 toward frame 102 and lengthened by sliding second temple pieces 106 away from frame 102.

Adjustment mechanisms 116 each include an angle adjustment device 206 and a complementary angle adjustment device 208 which, in this particular embodiment, are depicted by way of example as being integral parts of first temple portions 200 and second temple portions 202, respectively. In this example, each angle adjustment device 206 is a sloped feature defining a pair of sloped channels 210 formed on opposite sides (i.e. top and bottom) of the feature. Each complementary adjustment device 208 includes a pair of projections 212 that are adapted to slidably engage a respective pair of channels 210.

Each locking mechanisms 116 includes a plurality of through-holes 214 formed through first temple portion 200 and a complementary projection 216 formed on a flexible tab 218 of second temple portion 202. Each of through-holes 214 are adapted to receive projection 216 such that eyewear 100 can be configured in a discrete number (five in this example) of fixed positions. That is, each of through-holes 214 is associated with a discrete one of five positions, each of which is characterized by a unique length and angle of temple piece 106. Flexible tab 218 facilitates the adjustment of temple piece 106 from one discrete fixed position to another. To adjust temple piece 106, tab 218 is flexed inward by some suitable means (e.g., fingernail) a distance sufficient to allow second temple portion 202 to slide along first temple piece 200. After projection 216 is properly aligned with another desired one of through-holes 214, tab 218 is released thereby locking temple piece 106 into position. Of course, this routine is done on both temple pieces 106.

Figure 3:
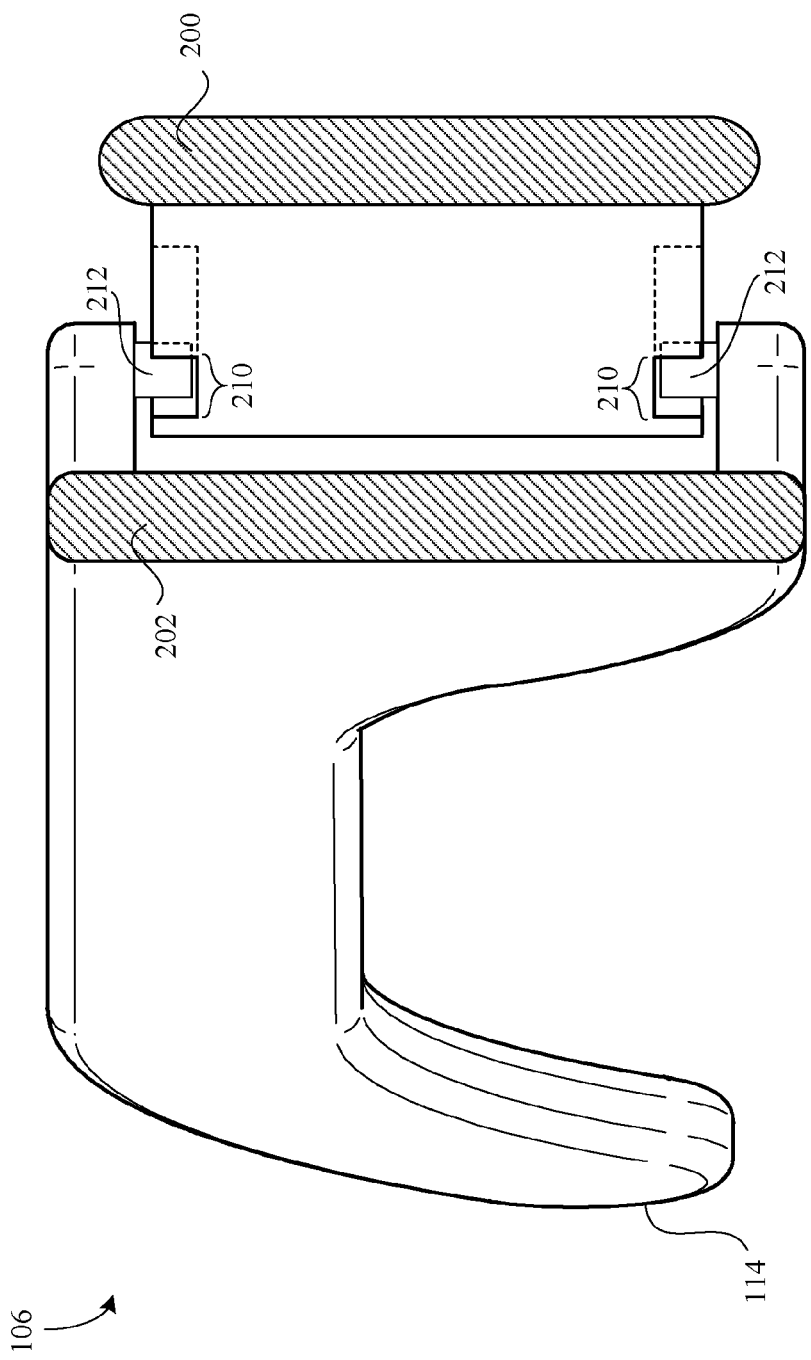
FIG. 3 is a cross-sectional view of a temple piece of the eyewear of FIG. 1 taken along line A-A of FIG. 1.

FIG. 3 shows a cross-sectional view of temple piece 106 taken along line A-A of FIG. 1 wherein protrusion 216 (visible in FIGS. 1-2) is seated in the front through-hole 214 which is closest to line 118. As shown, protrusions 212 are positioned in channels 210 so as to cooperate as a groove and follower.

Figure 4A:
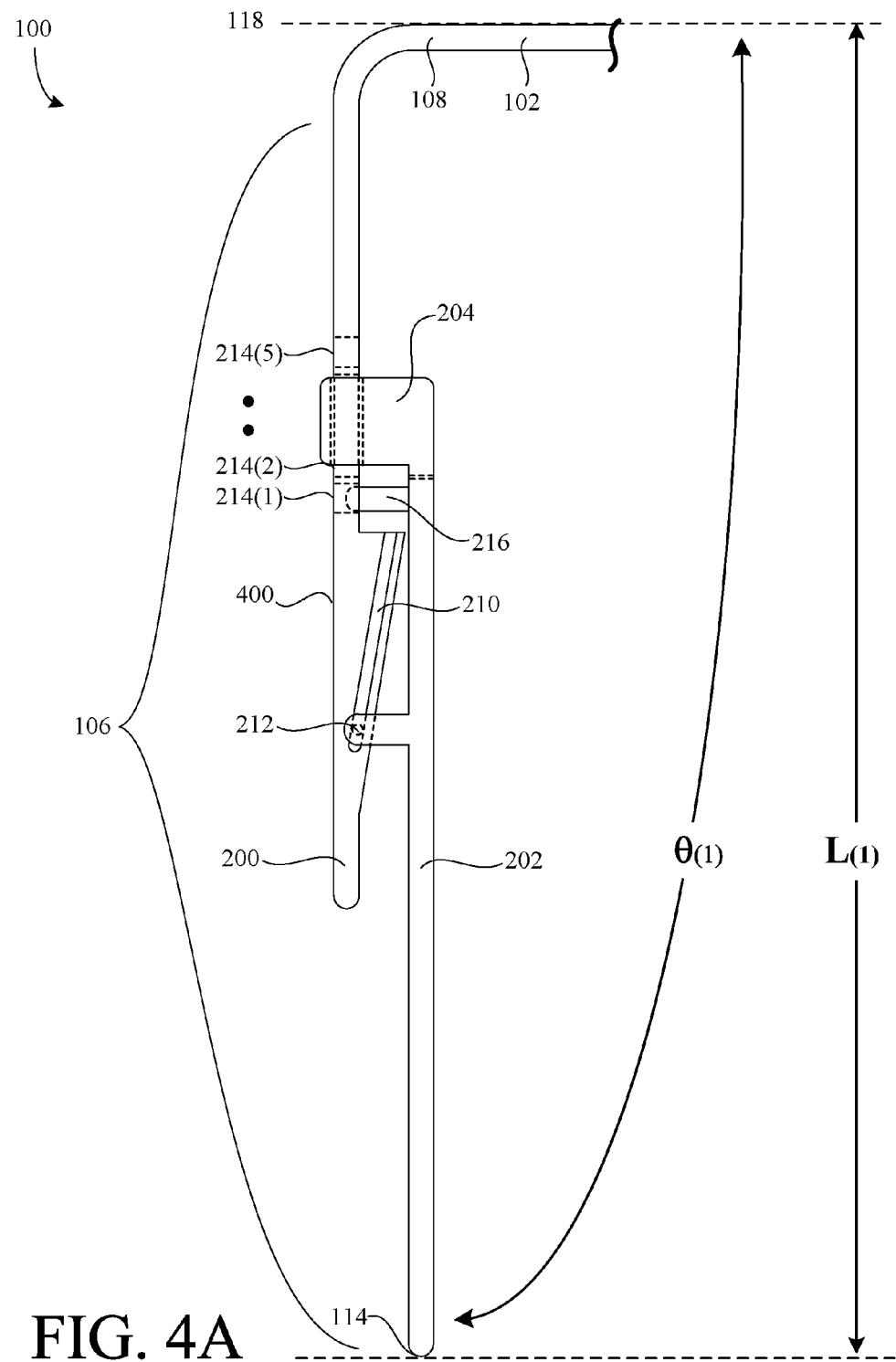
FIG. 4A is a top plan view of the temple piece of FIG. 1 in a first of five fixed positions.

FIG. 4A shows a top view of temple piece 106 in a fixed position wherein projection 216 is inserted in through-hole 214(1). Note that L(1) denotes the distance between distal end 114 and line 118 when projection 216 is positioned in through-hole 214(1) Likewise, the angle of temple piece 106 with respect to line 118 is denoted by θ(1) As shown, channel 210 is slightly angled with respect to the direction at which first temple piece 200 extends from first side 108 of frame 102. That is, the distance between the closed end of channel 210 and an outside surface 400 of first temple portion 200 is less than the distance between the open end of channel 210 and surface 400. Indeed, the distance between projections 212 and surface 400 increases as second temple portion 202 advances toward frame 102 thereby urging second temple portion 202 inward. Accordingly, both L and θ decrease simultaneously as projection 216 is removed from one through-hole 214 and placed in another that is closer to line 118. Oppositely, both L and θ increase simultaneously as projection 216 is removed from one through-hole 214 and placed in another that is further from line 118. As shown, through-hole 214(1) is furthest from line 118 such that L(1) and θ(1) are at the maximum fixed position setting.

Figure 4B:
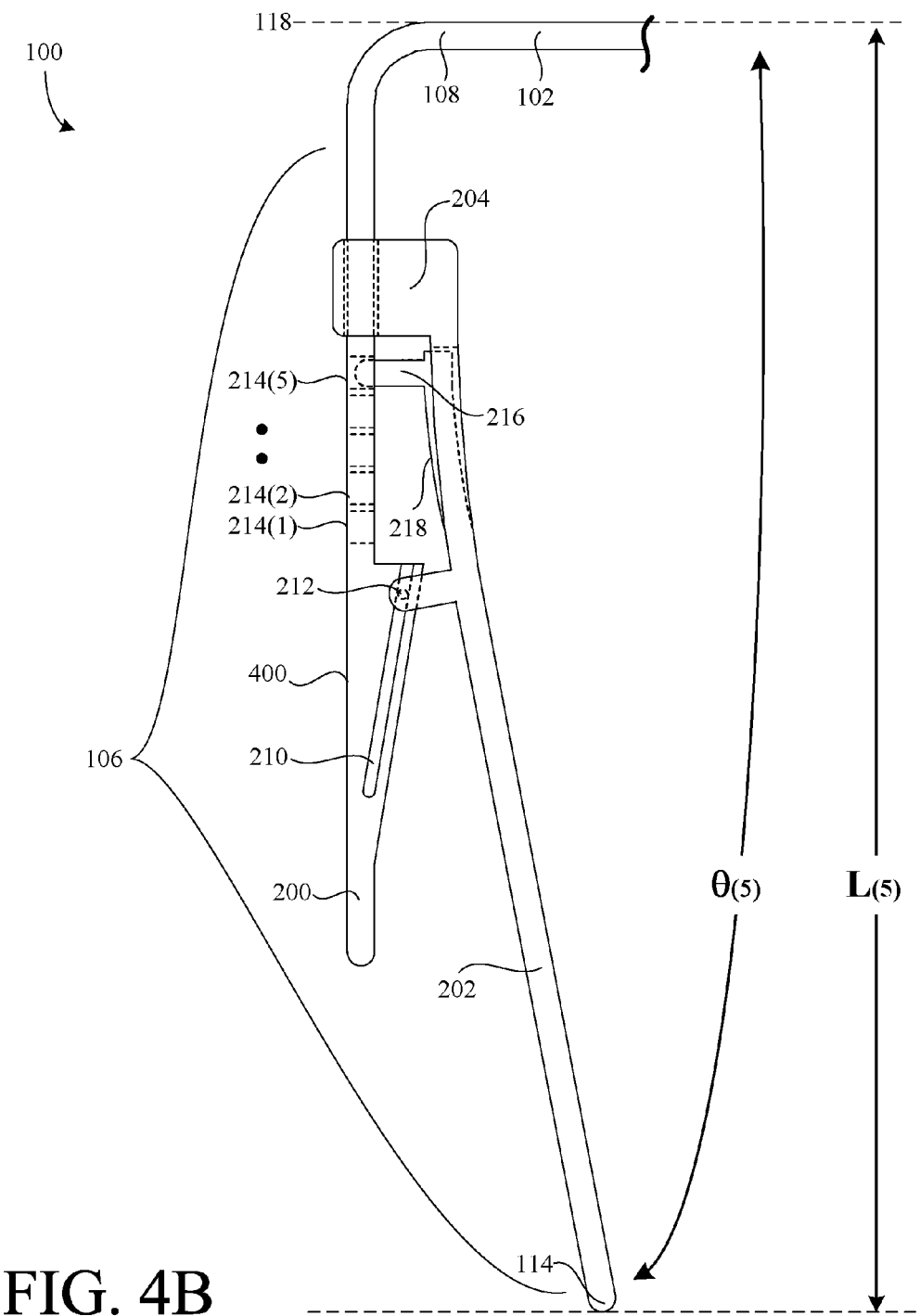
FIG. 4B is a top plan view of the temple piece of FIG. 4A in a fifth of five fixed positions.

FIG. 4B shows a top view of temple piece 106 in a fixed position wherein projection 216 is inserted in through-hole 214(5). As shown, through-hole 214(5) is closest to line 118 such that L(5) and θ(5) are at the minimum fixed position setting. The increase in distance between channel 210 and surface 400 toward the open end of channel 210 directs projections 212 inward as temple portion 202 is advanced toward frame 102. In response to being urged inward, temple portion 202 is deflected inward thereby reducing L and θ. Thus, L(1) shown in FIG. 4A is greater than L(5) and θ(1) also shown in FIG. 4A is greater than θ(5). Those skilled in the art will recognize that the deflection in temple portion 202 is within the elastic range of the material from which it is formed and, therefore, will deflect back outward as projections 212 advance back toward the closed end of channel 210.

Figure 5:
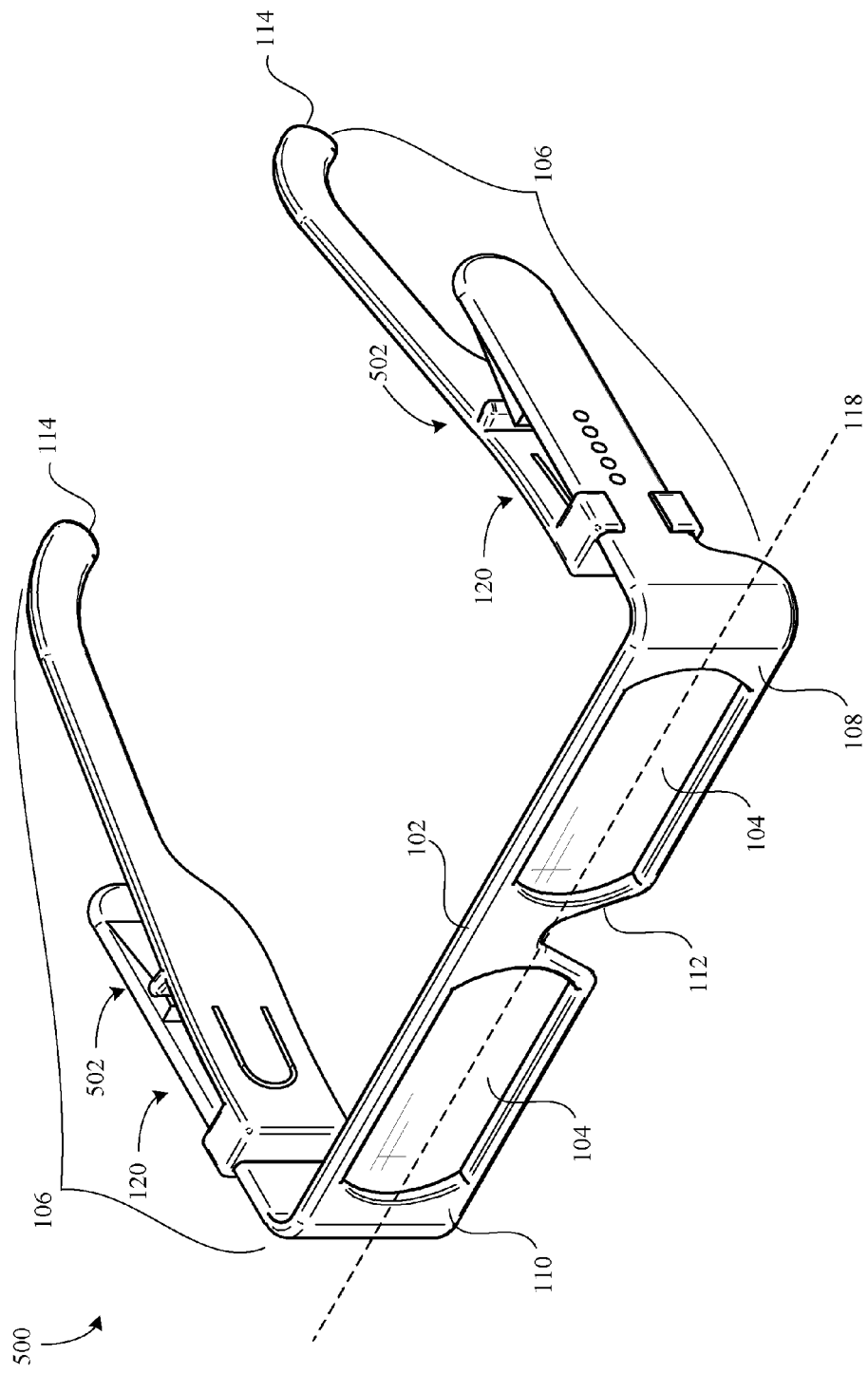
FIG. 5 is a front perspective view of eyewear with adjustable temple pieces according to another embodiment of the present invention.

FIG. 5 is a perspective view of a pair of eyewear 500 according to another embodiment of the present invention. Note that eyewear 500 is substantially identical to eyewear 100 in that the only difference is that adjustment mechanism 116 is substituted with a slightly modified adjustment mechanism 502. Therefore, all other elements of eyewear 500 identical to those of eyewear 100 will be denoted by like reference numbers and withheld from the following description so as to avoid redundancy.

Figure 6:
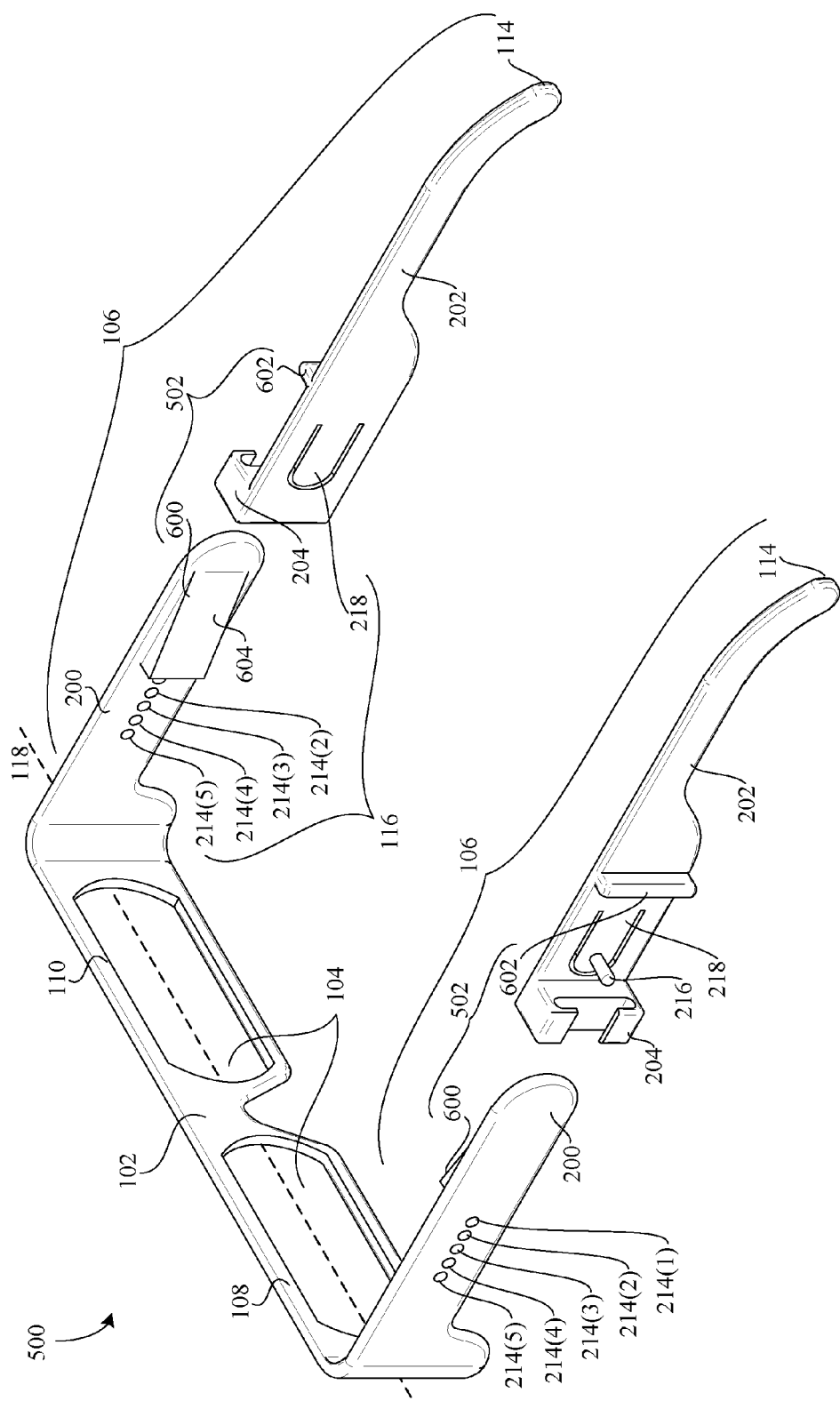
FIG. 6 is a rear perspective view of the eyewear of FIG. 5 disassembled.

FIG. 6 is a rear perspective view of eyewear 500 wherein temple pieces 106 are shown disassembled. Adjustment mechanisms 502 each include an angle adjustment device 600 and a complementary angle adjustment device 602 which, in this particular embodiment, are depicted by way of example as being integral parts of first temple portions 200 and second temple portions 202, respectively. In this example, each angle adjustment device 600 is a ramp feature having a sloped surface 604 that is sloped in the same general direction as channels 210 of eyewear 100. Each complementary adjustment device 602 is an elongated projection that is adapted to slidably abut sloped surface 604.

Figure 7A:
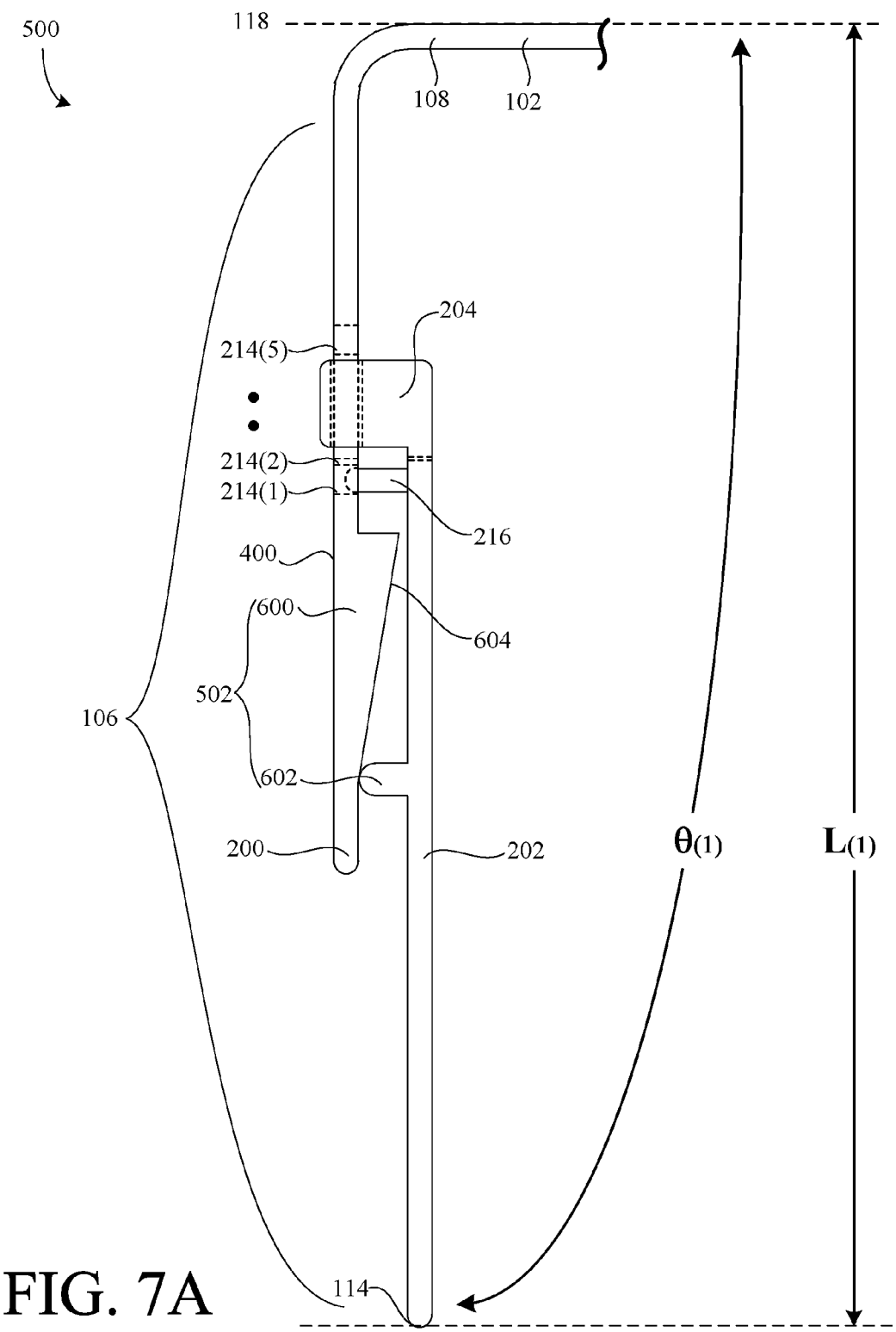
FIG. 7A is a top plan view of a temple piece of the eyewear of FIG. 5 in a first of five fixed positions.

FIG. 7A shows a top view of temple piece 106 of eyewear 500 in a fixed position wherein projection 216 is inserted in through-hole 214(1). As previously mentioned, L(1) denotes the distance between distal end 114 and line 118 when projection 216 is positioned in through-hole 214(1). Likewise, the angle of temple piece 106 with respect to line 118 is denoted by θ(1). As shown, ramped surface 604 is slightly angled with respect to the direction at which first temple piece 200 extends from first side 108 of frame 102. That is, the distance between the bottom end of sloped surface 604 and an outside surface 400 of first temple portion 200 is less than the distance between the top edge of sloped surface 604 and surface 400. With projection 216 positioned at through-hole 214(1), projection 602 abuts the bottom end of sloped surface 604 and, therefore, imparts minimal to no deflection on temple portion 202. Accordingly, L(1) and θ(1) are at the maximum fixed position setting.

Figure 7B:
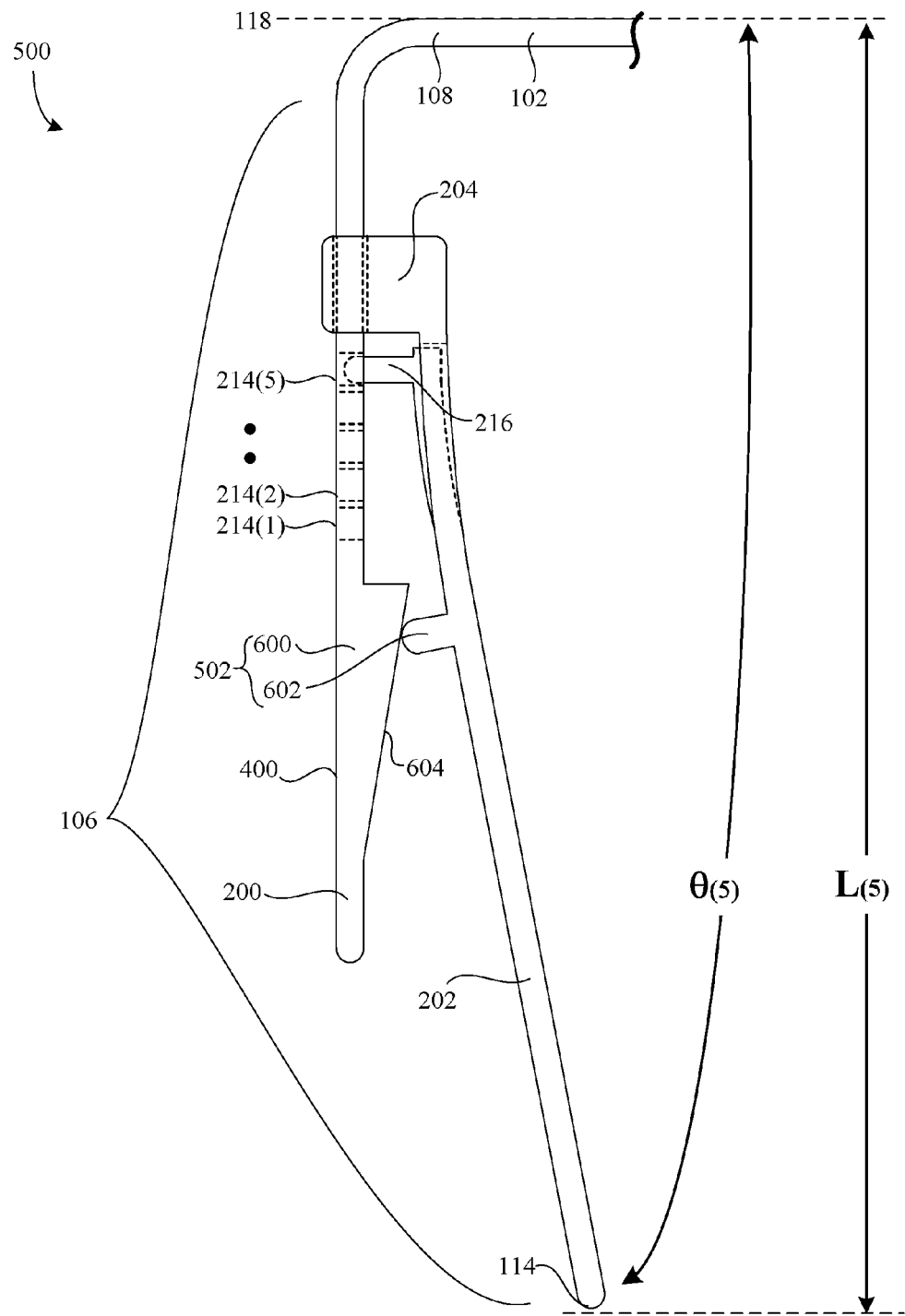
FIG. 7B is a top plan view of the temple piece of FIG. 7A in a fifth of five fixed positions.

FIG. 7B shows a top view of temple piece 106 of eyewear 500 in a fixed position wherein projection 216 is positioned in through-hole 214(5). As shown, through-hole 214(5) is closest to line 118 such that L(5) and θ(5) are at the minimum fixed position setting. The increase in distance between sloped surface 604 and surface 400 toward the top end of angle adjustment device (i.e. ramp feature) urges projection 602 inward as temple portion 202 is advanced toward frame 102. In response to being urged inward, temple portion 202 is deflected inward thereby reducing L and θ. Thus, L(1) shown in FIG. 7A is greater than L(5) and θ(1) also shown in FIG. 7A is greater than θ(5).

Figure 8:
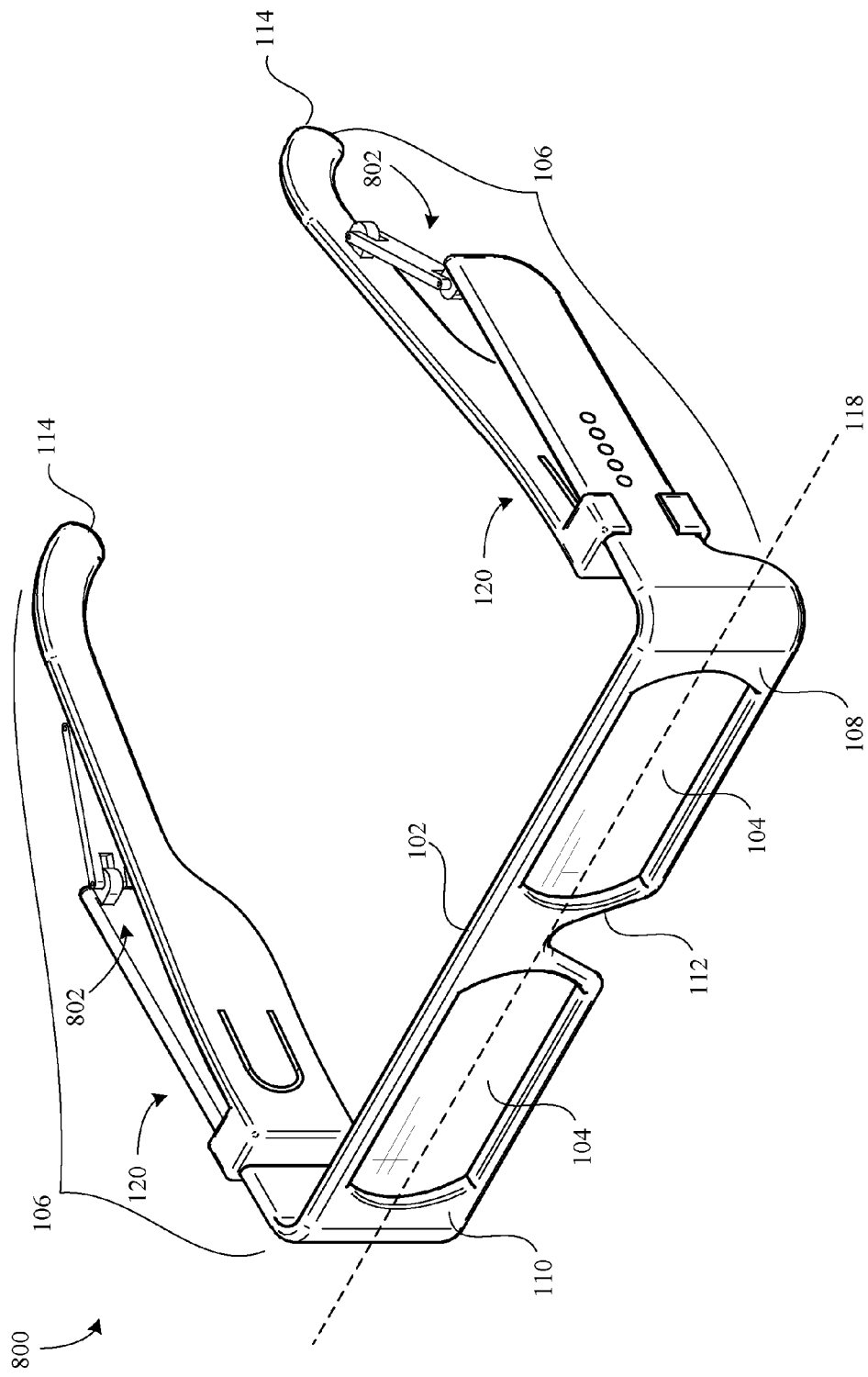
FIG. 8 is a front perspective view of eyewear with adjustable temple pieces according to yet another embodiment of the present invention.

FIG. 8 is a perspective view of a pair of eyewear 800 according to yet another embodiment of the present invention. Note that eyewear 800 is substantially similar to eyewear 100 in that the only difference is that adjustment mechanism 116 is substituted an alternative adjustment mechanism 802. Therefore, all other elements of eyewear 800 that are identical to those of eyewear 100 are denoted by like reference numbers and withheld from the following description so as to avoid redundancy.

Figure 9:
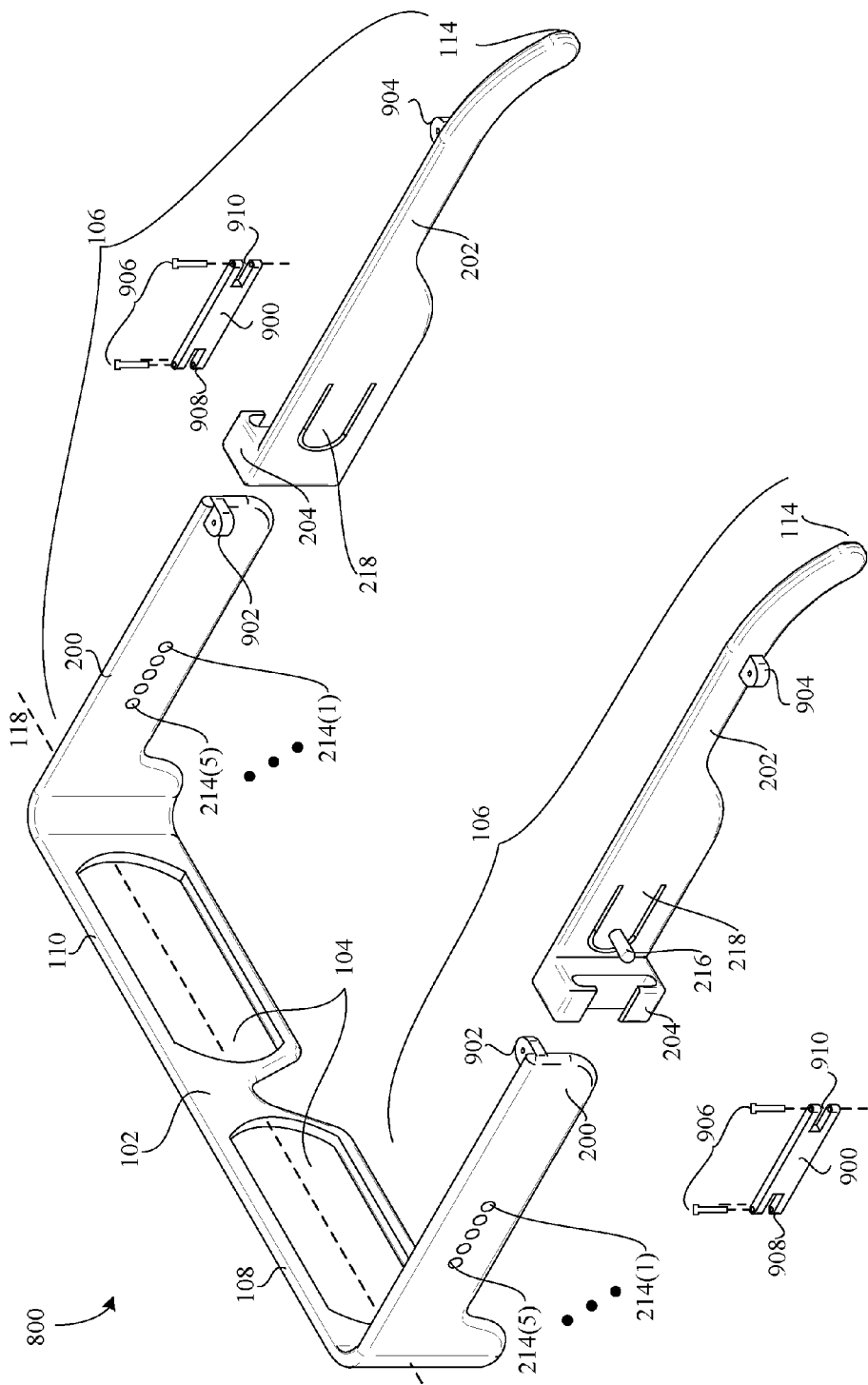
FIG. 9 is a rear perspective view of the eyewear of FIG. 8 disassembled.

FIG. 9 is a rear perspective view of eyewear 800 wherein temple pieces 106 are shown disassembled. Adjustment mechanisms 802 each include a linking member 900, a hinge feature 902 formed on temple portion 200, a second hinge feature 904 formed on temple portion 202, and a pair of hinge pins 906. Linking member 900 includes a first complementary hinge feature 908 and a second complementary hinge feature 910 adapted to pivotally couple to first hinge feature 902 and second hinge feature 904, respectively, via hinge pins 906.

Figure 10A:
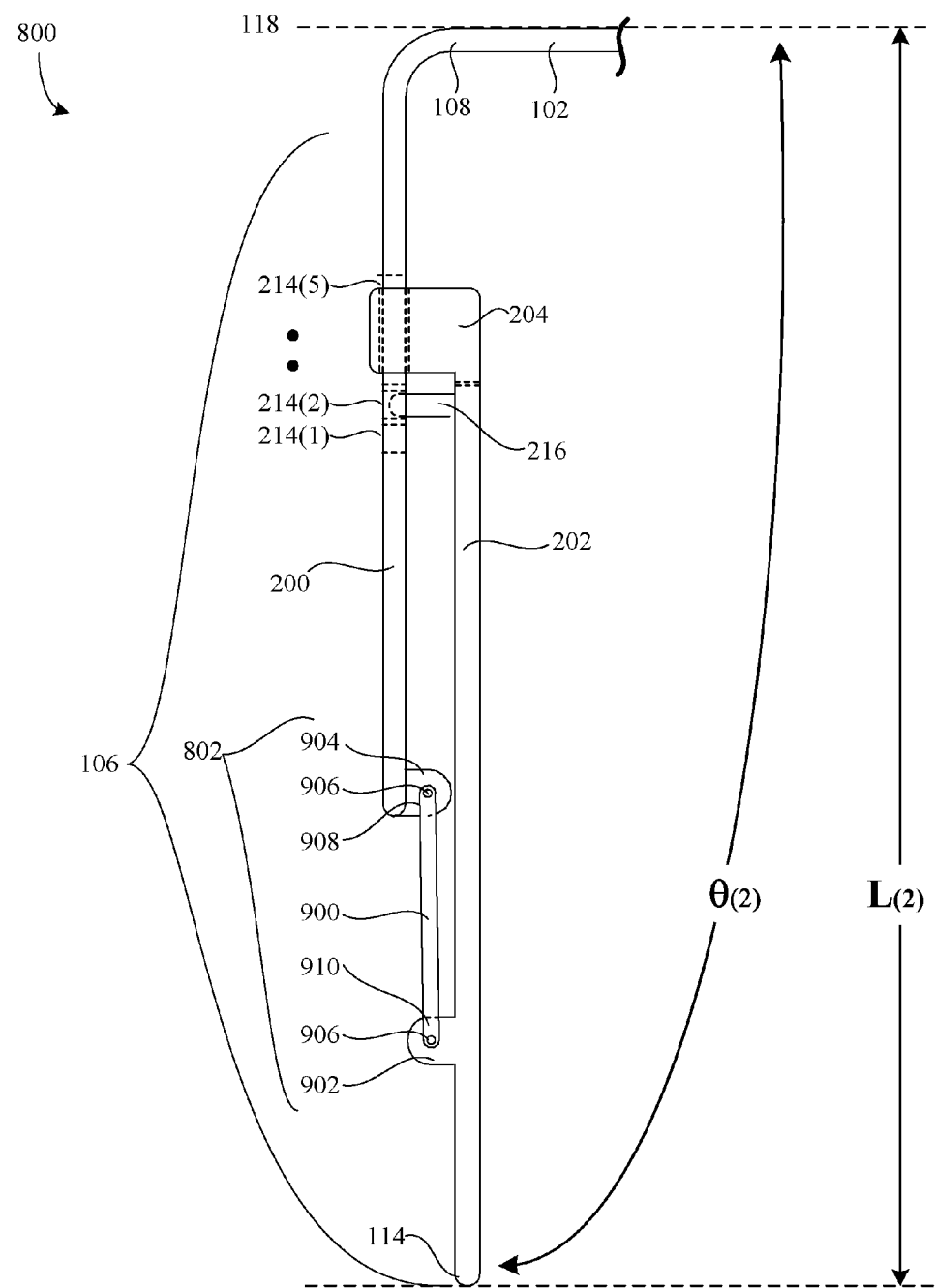
FIG. 10A is a top plan view of a temple piece of the eyewear of FIG. 8 in a first of five fixed positions.

FIG. 10A shows a top view of temple piece 106 of eyewear 800 in a fixed position wherein projection 216 is inserted in through-hole 214(2). L(2) denotes the distance between distal end 114 and line 118 when projection 216 is positioned in through-hole 214(2). Likewise, the angle of temple piece 106 with respect to line 118 is denoted by θ(2). When projection 216 is positioned in through-hole 214(2), linking member 900 a slight biasing force on hinge features 902 and 904. As a result, temple portion 202 is in a slightly relaxed state and is aligned nearly parallel to temple portion 200.

Figure 10B:
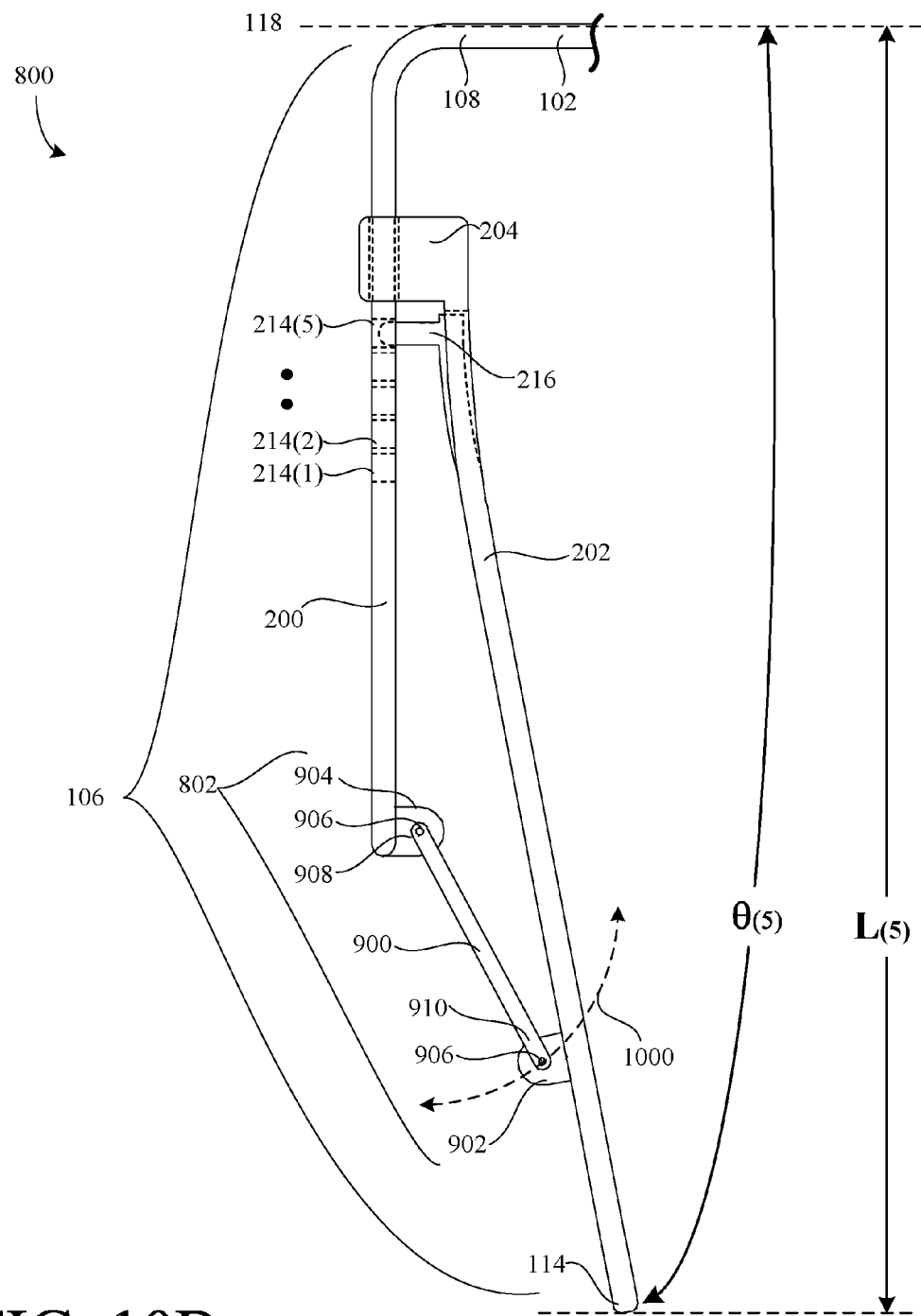
FIG. 10B is a top plan view of the temple piece of FIG. 10A in a fifth of five fixed positions.

FIG. 10B shows a top view of temple piece 106 of eyewear 800 in a fixed position wherein projection 216 is positioned in through-hole 214(5). As shown, through-hole 214(5) is closest to line 118 such that L(5) and θ(5) are at their minimum values. It should be recognized that when temple portion 202 is advanced toward frame 102, linking member 900 prevents hinge feature 904 from advancing in the same linear direction. Rather, linking member 900 forces hinge feature 904 to move along a radial path 1000 centered about the hinge pin 906 disposed in hinge features 902 and 908. As a result, hinge feature 904 and, therefore, temple portion 202 are urged inward thereby reducing L and θ. Thus, L(2) shown in FIG. 10A is greater than L(5) and θ(2) also shown in FIG. 10A is greater than θ(5).

Figure 11:
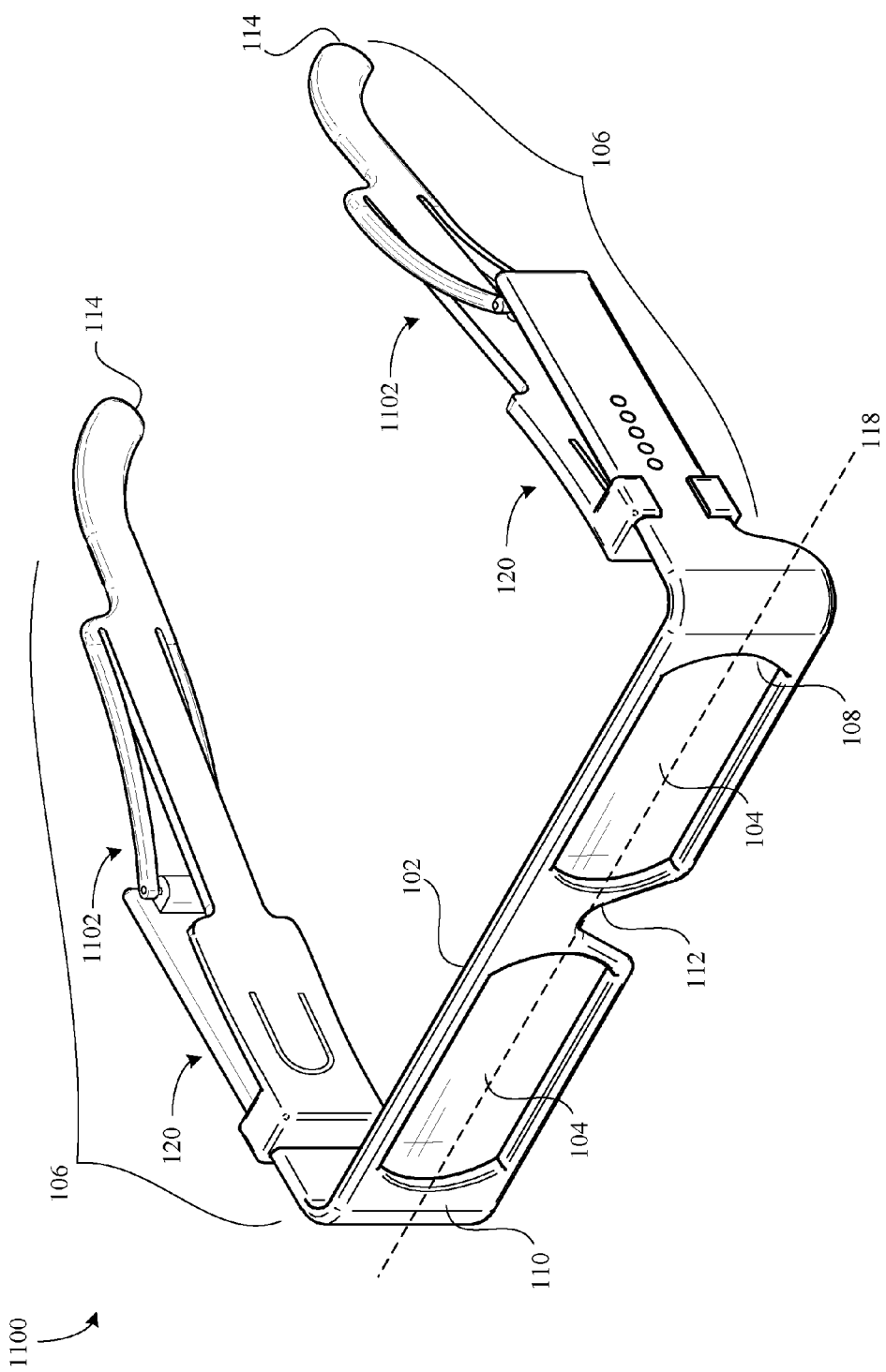
FIG. 11 is a front perspective view of eyewear with adjustable temple pieces according to yet another embodiment of the present invention.

FIG. 11 is a perspective view of a pair of eyewear 1100 according to yet another embodiment of the present invention. Note that eyewear 1100 is substantially identical to eyewear 100 in that the only difference is that adjustment mechanism 116 is substituted with an alternative adjustment mechanism 1102. Therefore, all other elements of eyewear 1100 that are identical to those of eyewear 100 are denoted by like reference numbers and withheld from the following description so as to avoid redundancy.

Figure 12:
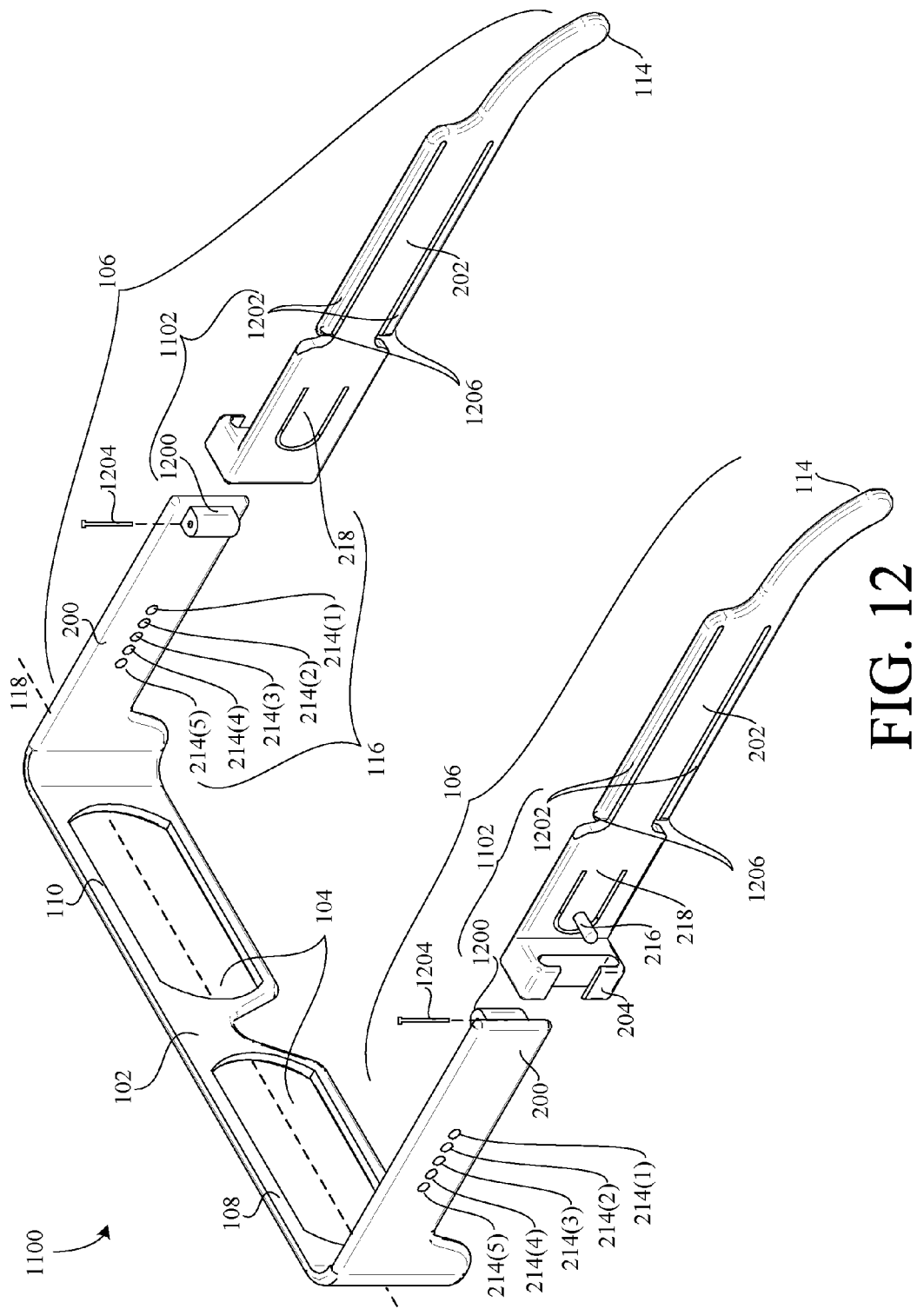
FIG. 12 is a rear perspective view of the eyewear of FIG. 11 disassembled.

FIG. 12 is a rear perspective view of eyewear 1100 wherein temple pieces 106 are shown disassembled. Adjustment mechanisms 1102 each include a hinge feature 1200 formed on temple portion 200, a set of flexible arms 1202 formed on temple portion 202, and a hinge pin 1204. Each of flexible arms includes a distal end 1206 that is adapted to pivotally couple to first hinge feature 1200 via hinge pins 1204.

Figure 13A:
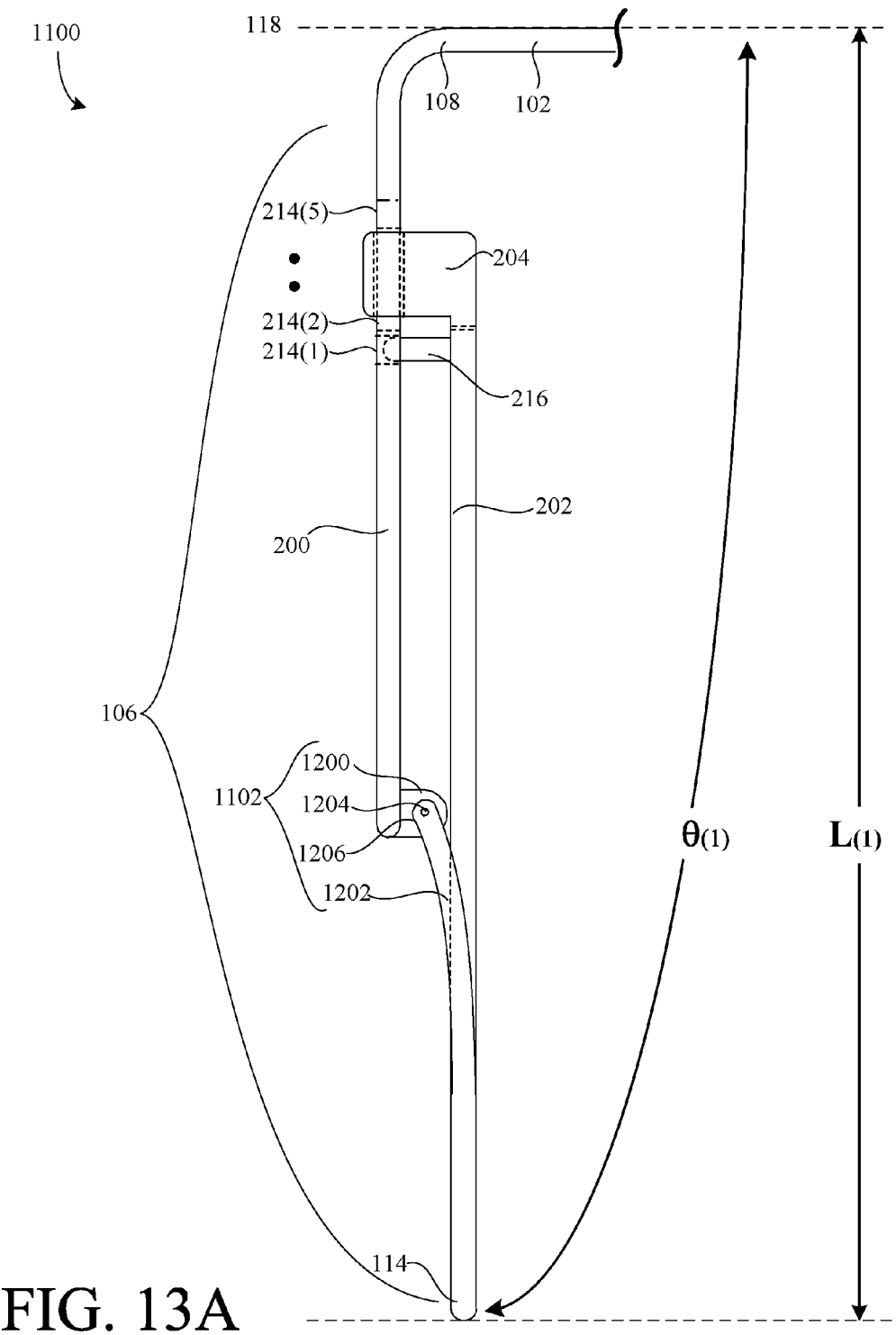
FIG. 13A is a top plan view of a temple piece of the eyewear of FIG. 11 in a first of five fixed positions.

FIG. 13A shows a top view of temple piece 106 of eyewear 1100 in a fixed position wherein projection 216 is inserted in through-hole 214(1). As previously mentioned, L(1) denotes the distance between distal end 114 and line 118 when projection 216 is positioned in through-hole 214(1). Likewise, the angle of temple piece 106 with respect to line 118 is denoted by θ(1). When projection 216 is positioned in through-hole 214(1), flexible arms 1202 are only slightly deflected outward and, therefore, impart only a slight biasing force to temple portion 202. As a result, temple portion 202 is in a somewhat relaxed state and is aligned substantially parallel to temple portion 200. Accordingly, L(1) and θ(1) are at their maximum values when projection 216 is positioned in through-hole 214(1).

Figure 13B:
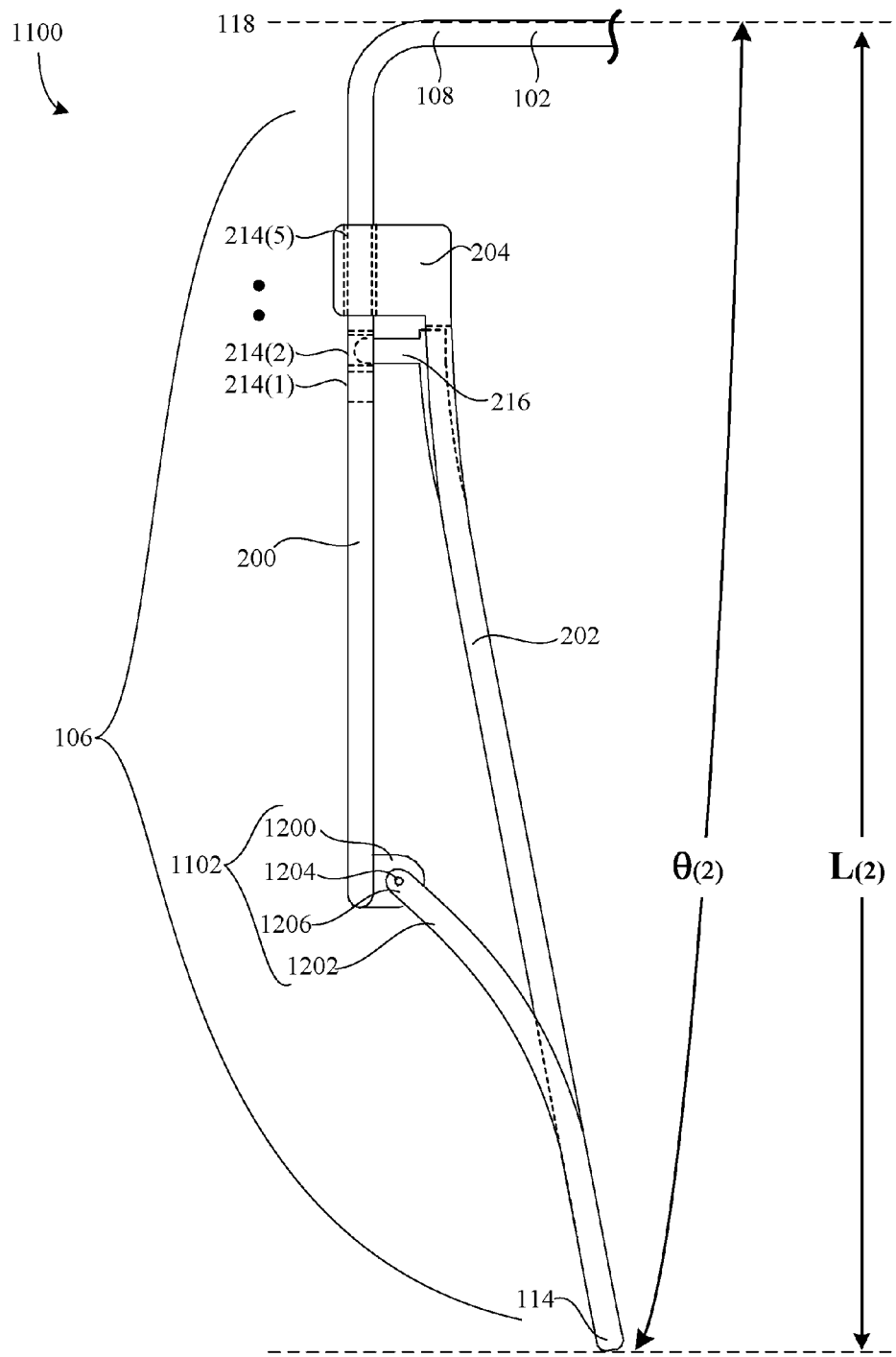
FIG. 13B is a top plan view of the temple piece of FIG. 13A in a second of five fixed positions.

FIG. 13B shows a top view of temple piece 106 of eyewear 1100 in a fixed position wherein projection 216 is positioned in through-hole 214(2). When temple portion 202 is advanced toward frame 102, the deflection in flexible arms 1202 increases and urges temple portion 202 inward thereby reducing L and θ. Thus, L(1) and θ(1) (shown in FIG. 13A) are greater than L(2) and θ(2), respectively.

Figure 14:
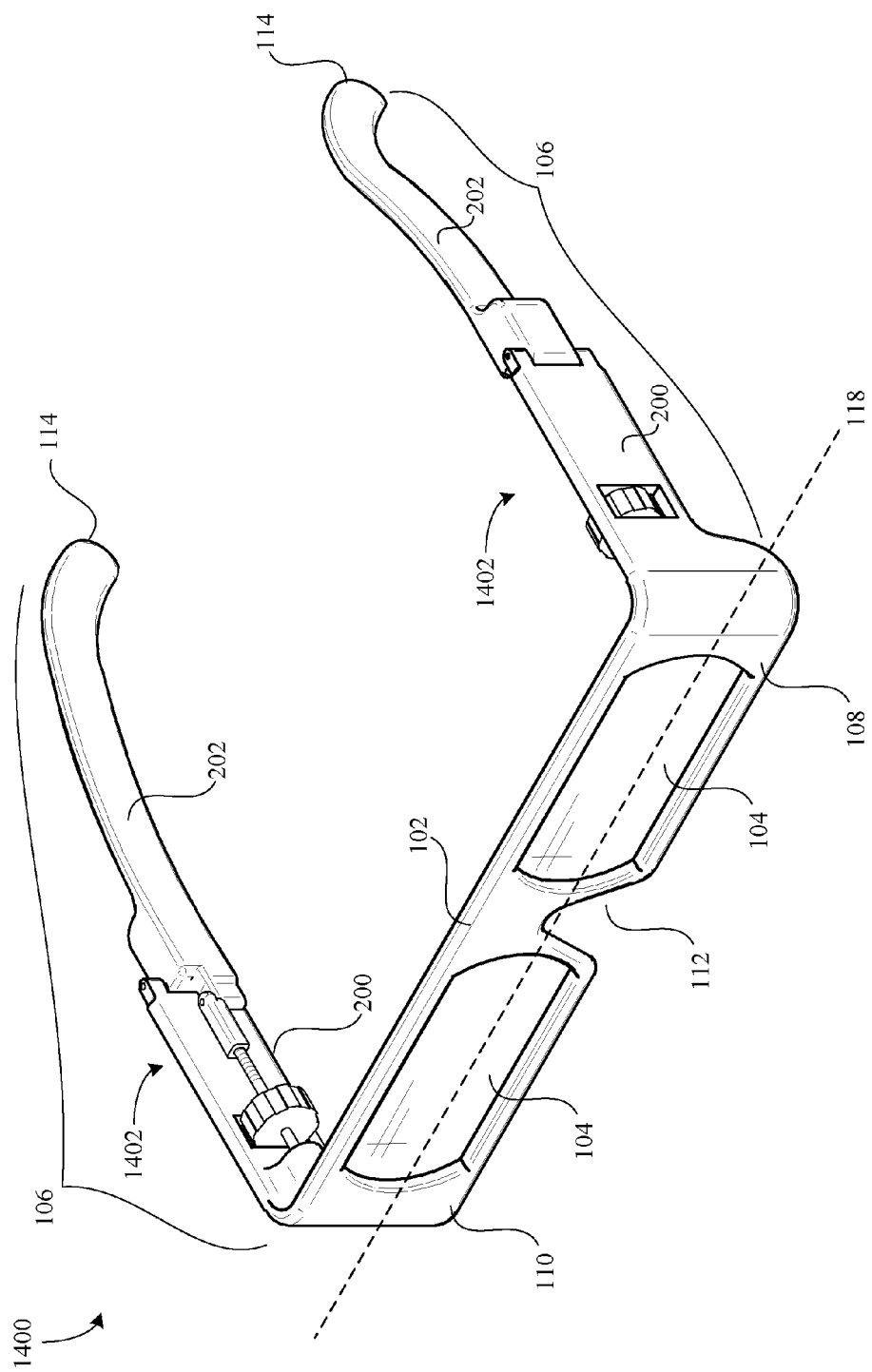
FIG. 14 is a front perspective view of eyewear with adjustable temple pieces according to yet another embodiment of the present invention.

FIG. 14 is a perspective view of a pair of eyewear 1400 according to yet another embodiment of the present invention. Note that eyewear 1400 is substantially similar to eyewear 100 with the exception of a few modifications such as substituting adjustment mechanism 116 and locking mechanism 120 with an alternative adjustment mechanism 1402. Therefore, all other elements of eyewear 1400 that are identical to those of eyewear 100 are denoted by like reference numbers and withheld from the following description so as to avoid redundancy.

Figure 15:
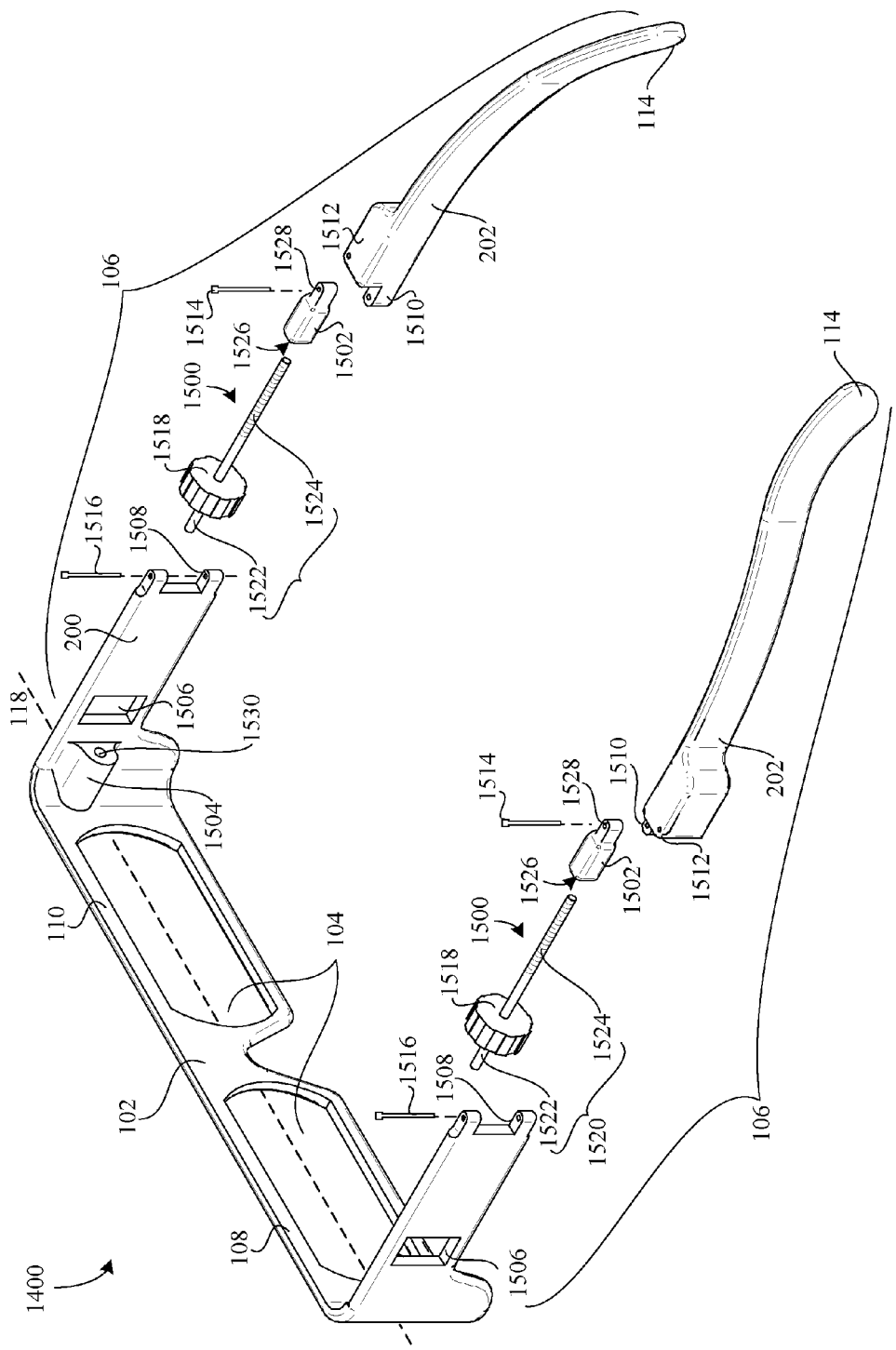
FIG. 15 is a rear perspective view of the eyewear of FIG. 14 disassembled.

FIG. 15 is a rear perspective view of eyewear 1400 wherein temple pieces 106 are shown disassembled. Adjustment mechanisms 1402 each include a thumbwheel device 1500, a female rod hinge 1502, a rod support feature 1504 formed on temple portion 200, a rectangular opening 1506 formed through temple portion 200, a hinge feature 1508 formed on temple portion 200, a first hinge feature 1510 formed on temple portion 202, a second hinge feature 1512 formed on temple portion 202, a first hinge pin 1514, and a second hinge pin 1516. Thumbwheel device 1500 includes a thumbwheel 1518 fixably coupled to a rod 1520 extending from each side. Rod 1520 includes a first end 1522 and a threaded second end 1524. Rod hinge 1502 includes threaded opening 1526 (not visible) and a hinge feature 1528. Opening 1526 is adapted to receive threaded second end 1524 of rod 1520. When thumbwheel 1518 is rotated, threaded shaft moves into or out of opening 1526 depending on the direction of rotation. Hinge feature 1528 pivotally couples to hinge feature 1510 via pin 1514. Rod support feature 1504 defines a bore 1530 that is adapted to receive first end 1522 of rod 1520. When first end 1522 of rod 1520 is position and supported in bore 1530, it is free to rotate. When eyewear 1400 is assembled, thumbwheel is aligned with opening 1526 and extends partially therethrough such that it can be rotated by the wearer. Hinge feature 1508 is pivotally coupled to hinge feature 1512 via pin 1514 so as to pivotally couple temple portions 200 and 202 to one another.

Figure 16A:
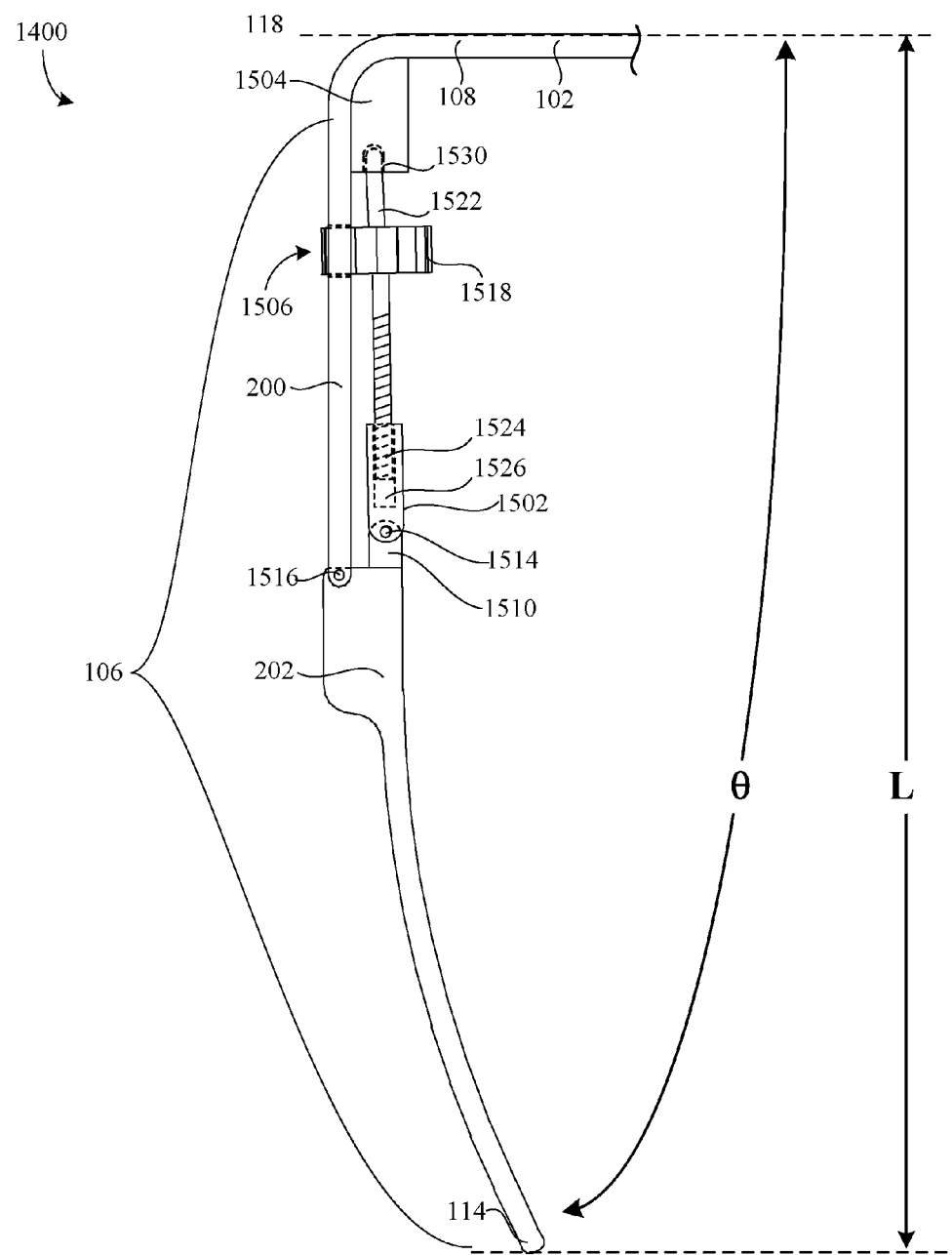
FIG. 16A is a top plan view of a temple piece of the eyewear of FIG. 14 in a fixed position.

FIG. 16A shows a top view of temple piece 106 of eyewear 1400 in a fixed position wherein threaded end 1524 of rod 1520 is threaded slightly into threaded opening 1526 of rod hinge 1502. Although not shown, some suitable means would be used to prevent end 1522 of rod 1520 from coming out of bore 1530 while also allowing it to rotate. For example, end 1522 could be slightly bulged and bore 1530 could be rounded such that both cooperate as a ball-in-socket feature.

Figure 16B:
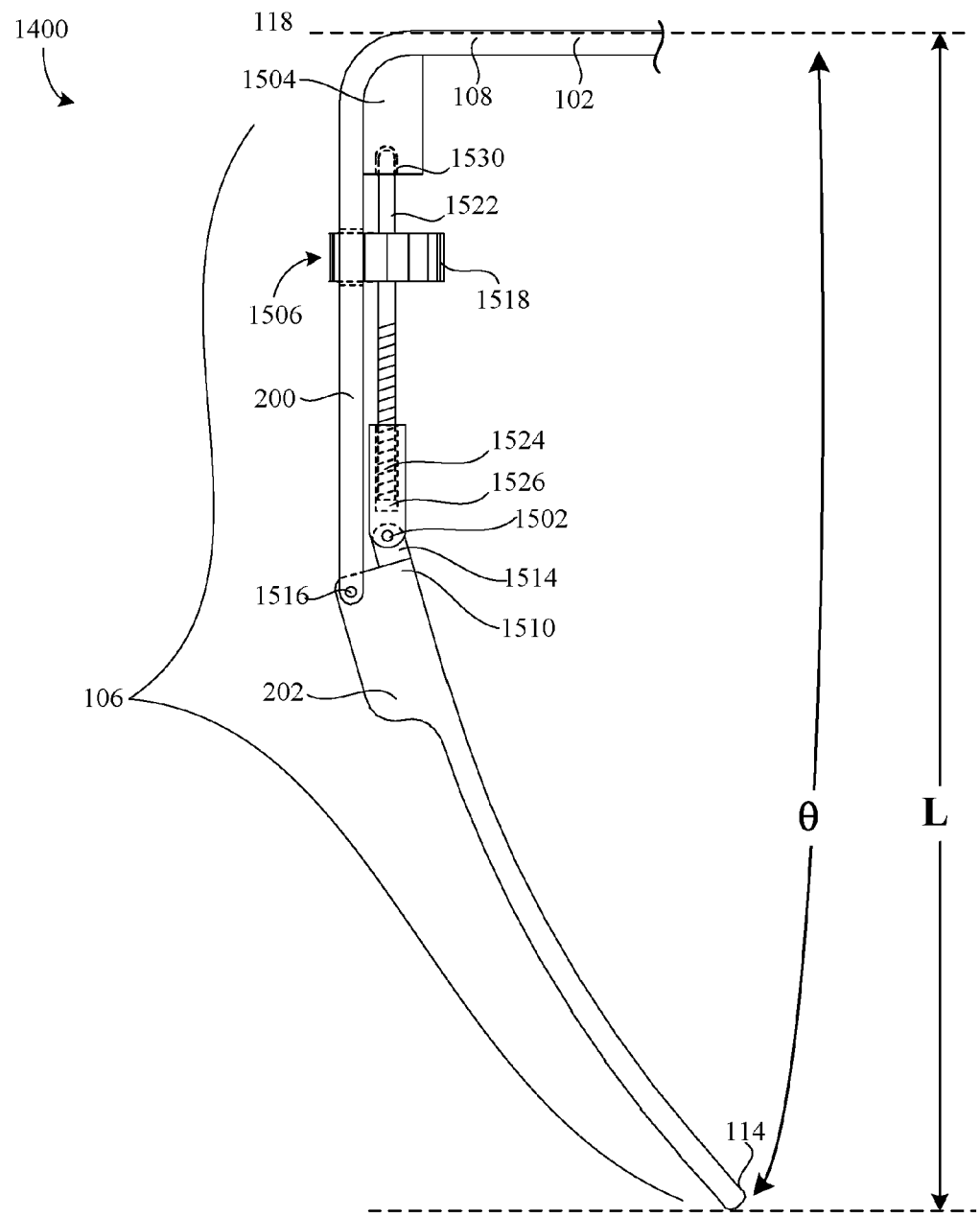
FIG. 16B is a top plan view of the temple piece of FIG. 16A in another fixed position.

FIG. 16B shows a top view of temple piece 106 of eyewear 1400 in a fixed position wherein threaded end 1524 of rod 1520 is threaded deep into threaded opening 1526 of rod hinge 1502. It should be understood that the deeper threaded end 1524 is threaded into opening 1526, the shorter the distance between rod hinge 1502 and frame 102 becomes. Of course, as the distance between rod hinge 1502 and frame 102 becomes shorter, temple portion 202 rotates further about pin 1516 thus decreasing the length L and angle θ of temple piece 106. Accordingly, rotating thumbwheel 1518 decreases both length L and angle θ of temple piece 106 simultaneously while rotating it in the opposite direction increases both length L and angle θ simultaneously.

Figure 17:
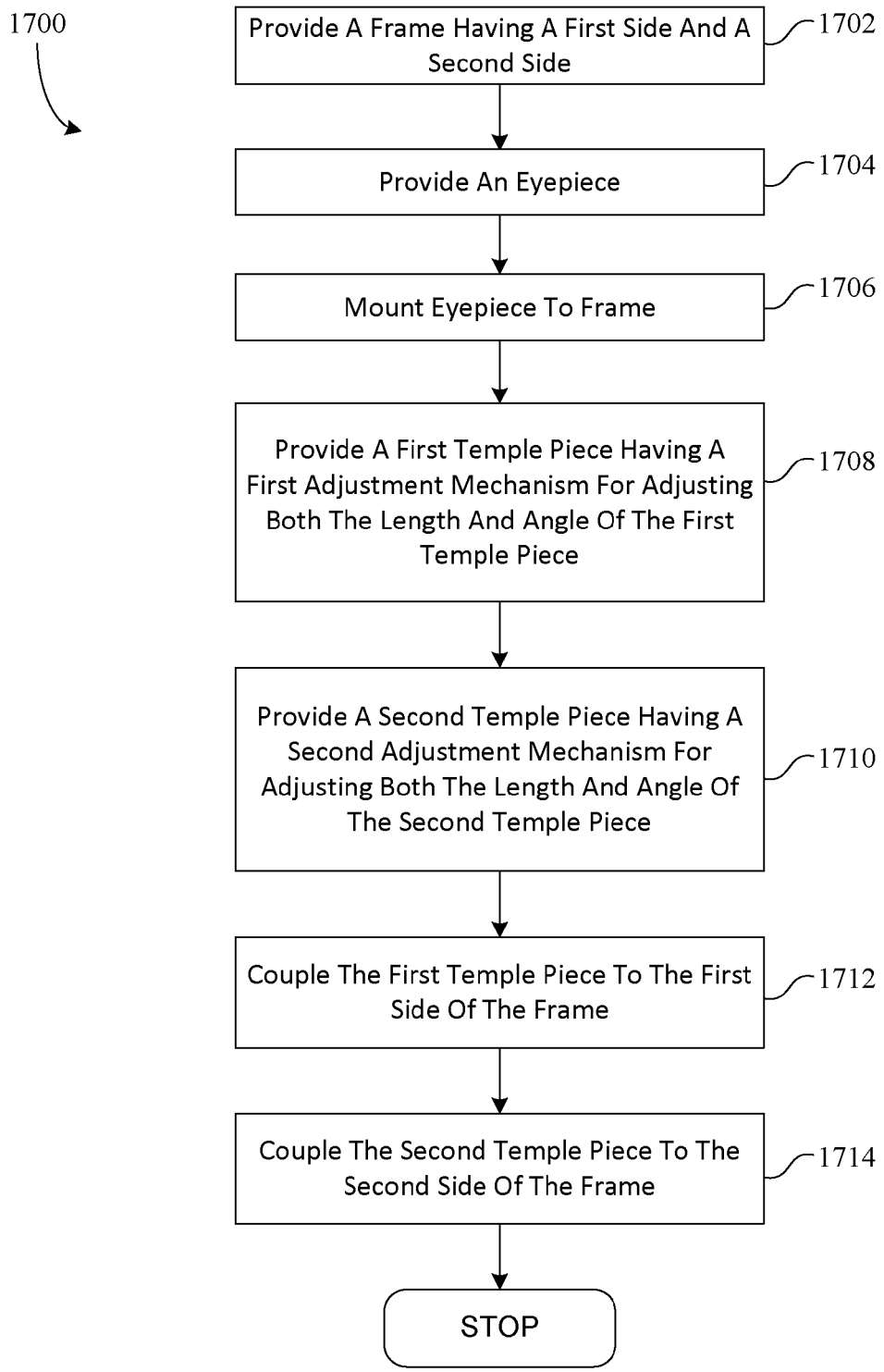
FIG. 17 is a flow chart summarizing one method of manufacturing eyewear.

FIG. 17 is a flow chart summarizing one method 1700 for manufacturing adjustable eyewear according to one embodiment of the present invention. In a first step 1702, a frame is provided. The frame includes a first side and a second side. Then, in a second step 1704, an eyepiece is provided. Next, in a third step 1706, the eyepiece is mounted to the frame. Then, in a forth step 1708, a first temple piece is provided. The first temple piece includes a first adjustment mechanism for adjusting both the length and angle of the first temple piece. Next, in a fifth step 1710, a second temple piece is provided. The second temple piece includes a second adjustment mechanism for adjusting both the length and angle of the second temple piece. Then, in a sixth step 1712, the first temple piece is coupled to the first side of the frame. Finally, in a seventh step 1714, the second temple piece is coupled to the second side of the frame.

The description of particular embodiments of the present invention is now complete. Many of the described features may be substituted, altered or omitted without departing from the scope of the invention. For example, alternate adjustment mechanisms (e.g., cam and followers, gears, etc.), may be substituted for the channel/projection mechanism, ramp/projection mechanism, linking mechanism, flexible arm mechanism, and/or thumbwheel mechanism. As another example, alternate locking mechanisms (e.g., clamp mechanisms, hook and loop fasteners, latches, etc), may be substituted for the projection/through-hole mechanism. These and other deviations from the particular embodiments shown will be apparent to those skilled in the art, particularly in view of the foregoing disclosure.

I claim:

1. Adjustable eyewear, comprising:
    a frame having a first side and a second side;
    a first temple piece coupled to said first side of said frame, said first temple piece having a length and including a first adjustment mechanism capable of adjusting both the length of said first temple piece and an angle of said first temple piece with respect to a line extending between said first side of said frame and said second side of said frame; and
    a second temple piece coupled to said second side of said frame, said second temple piece having a length and including a second adjustment mechanism capable of adjusting both the length of said second temple piece and an angle of said second temple piece with respect to said line extending between said first side of said frame and said second side of said frame; and wherein
    said eyewear is fixed-temple eyewear; and
    each of said first temple piece and said second temple piece includes a first temple portion rigidly affixed to said frame and extending away from said line extending between said first side of said frame and said second side of said frame, and
    a second temple portion slidably engaged with said first temple portion and adapted to engage the ear of a wearer of said eyewear, and
    whereby sliding said second temple portion with respect to said first temple portion facilitates adjusting the length of said temple piece.

2. The adjustable eyewear of claim 1, wherein:
    said first adjustment mechanism includes an angle adjustment device formed on one of said first temple portion and said second temple portion of said first temple piece;
    said first adjustment mechanism includes a complementary angle adjustment device formed on the other of said first temple portion and said second temple portion of said first temple piece; and
    sliding said second temple portion with respect to said first temple portion facilitates adjustment of said angle of said temple piece with respect to said line extending between said first side of said frame and said second side of said frame.

3. The adjustable eyewear of claim 2, wherein:
    said angle adjustment device defines at least one channel; and
    said complementary angle adjustment device includes at least one projection extending into said channel, and
    said projection moves within said channel when said second temple portion of said first temple piece is moved with respect to said first temple portion of said first temple piece, thereby changing said angle between said second temple portion of said first temple piece and said line extending between said first side of said frame and said second side of said frame.

4. The adjustable eyewear of claim 2, wherein:
    said angle adjustment device includes a ramp; and
    said complementary angle adjustment device includes a ramp engaging structure disposed to abut said ramp; and
    sliding second temple portion of said first temple piece with respect to said first temple portion of said first temple piece causes said ramp engaging structure to move along said ramp, thereby changing the angle between said second temple portion of said first temple piece and said line extending between said first side of said frame and said second side of said frame.

5. The adjustable eyewear of claim 1, wherein:
    said first adjustment mechanism includes a linking member coupled between said first temple portion and said second temple portion of said first temple piece; and
    sliding second temple portion of said first temple piece with respect to said first temple portion of said first temple piece changes the angle between said second temple portion of said first temple piece and said line extending between said first side of said frame and said second side of said frame.

6. The adjustable eyewear of claim 5, wherein said linking member includes a rigid, elongated piece having a first end pivotally coupled to said first temple portion of said first temple piece and a second end pivotally coupled to said second temple portion of said first temple piece.

7. The adjustable eyewear of claim 1, wherein said first temple portions are formed integrally with said frame.

8. The adjustable eyewear of claim 1, further comprising:
    a first locking mechanism adapted to selectively lock said first temple piece into one of a plurality of discrete adjusted positions, each of said adjusted positions being characterized by a unique temple piece length and a unique angle between a distal end of said temple piece and said line extending between said first side of said frame and said second side of said frame; and
    a second locking mechanism adapted to selectively lock said second temple piece into one of a plurality of discrete adjusted positions, each of said adjusted positions being characterized by a unique temple piece length and a unique angle between a distal end of said temple piece and said line extending between said first side of said frame and said second side of said frame; and
    wherein when said first temple piece and said second temple piece are each locked into a discrete adjusted position, said first temple piece and said second temple piece are fixed in position with respect to said frame.

9. The adjustable eyewear of claim 1, further comprising:
a first lens mounted to said frame, said first lens including a first plurality of dichroic filters; and
a second lens mounted to said frame, said second lens including a second plurality of dichroic filters, said dichroic filters of said second plurality of dichroic filters being different than said dichroic filters of said first plurality of dichroic filters.

10. The adjustable eyewear of claim 1, wherein each particular adjusted length of said first temple piece corresponds to a particular fixed angle of said first temple piece with respect to said line extending between said first side of said frame and said second side of said frame.

11. The adjustable eyewear of claim 1, wherein said first temple piece and said second temple piece are adjustable between a plurality of different discrete wear angles.

12. The adjustable eyewear of claim 1, wherein said first adjustment mechanism simultaneously adjusts the length of said first temple piece and said angle of said first temple piece.

13. A method of manufacturing adjustable eyewear, said method comprising:
providing a frame including a first side and a second side;
providing a first temple piece, said first temple piece having a length and including a first adjustment mechanism capable of adjusting both the length of said first temple piece and an angle of said first temple piece with respect to a line extending between said first side of said frame and said second side of said frame;
providing a second temple piece, said second temple piece having a length and including a second adjustment mechanism capable of adjusting both the length of said second temple piece and an angle of said second temple piece with respect to said line extending between said first side of said frame and said second side of said frame;
coupling said first temple piece to said first side of said frame; and
coupling said second temple piece to said second side of said frame; and
wherein said eyewear is fixed-temple eyewear; and
said step of providing said first temple piece including said first adjustment mechanism and said step of providing said second temple piece including said second adjustment mechanism each includes
providing a first temple portion rigidly affixed to said frame,
providing a second temple portion adapted to engage the ear of a wearer, and
slidably engaging said second temple portion with said first temple portion.

14. The method of claim 13, wherein said step of providing said first temple portion and said step of providing said second temple portion include:
incorporating an angle adjustment device in one of said first temple portion and said second temple portion; and
incorporating a complementary angle adjustment device in the other of said first temple portion and said second temple portion; and wherein
said step of slidably engaging said second temple portion with said first temple portion engages said angle adjustment device with said complementary angle adjustment device.

15. The method of claim 14, wherein:
said step of incorporating said angle adjustment device includes incorporating at least one channel; and
said step of incorporating said complementary angle adjustment device includes incorporating at least one projection.

16. The method of claim 14, wherein:
said step of incorporating said angle adjustment device includes incorporating a ramp; and
said step of incorporating said complementary angle adjustment device includes incorporating a ramp engaging structure.

17. The method of claim 13, wherein said step of providing said first temple piece with said first adjustment mechanism includes:
providing a linking member;
connecting a first end of said linking member to said first temple portion of said first temple piece; and
connecting a second end of said linking member to said second temple portion of said first temple piece.

18. The method of claim 13, wherein said step of providing said first temple portion rigidly affixed to said frame includes forming said first temple portion integrally with said frame.

19. The method of claim 13, further comprising:
incorporating into said first temple piece a first locking mechanism adapted to selectively lock said first temple piece into one of a plurality of discrete adjusted positions, each of said adjusted positions being characterized by a unique temple piece length and a unique angle between a distal end of said temple piece and said line extending between said first side of said frame and said second side of said frame; and
incorporating into said second temple piece a second locking mechanism adapted to selectively lock said second temple piece into one of a plurality of discrete adjusted positions, each of said adjusted positions being characterized by a unique temple piece length and a unique angle between a distal end of said temple piece and said line extending between said first side of said frame and said second side of said frame.

20. The method of claim 13, further comprising:
mounting a first lens to said frame, said first lens including a first plurality of dichroic filters; and
mounting a second lens to said frame, said second lens including a second plurality of dichroic filters, said dichroic filters of said second plurality of dichroic filters being different than said dichroic filters of said first plurality of dichroic filters.

21. The method of claim 13, wherein each particular adjusted length of said first temple piece corresponds to a particular fixed angle of said first temple piece with respect to said line extending between said first side of said frame and said second side of said frame.

22. The method of claim 13, wherein said first temple piece and said second temple piece are adjustable between a plurality of different discrete wear angles.

23. The method of claim 13, wherein said first adjustment mechanism simultaneously adjusts the length of said first temple piece and said angle of said first temple piece.

24. Adjustable eyewear, comprising:
a frame having a first side and a second side;
a first temple piece coupled to said first side of said frame, said first temple piece having a length and including a first portion coupled to said frame and a second portion slidably engaged with said first portion;
means for adjusting both the length of said first temple piece and an angle of said first temple piece with respect to a line extending between said first side of said frame and said second side of said frame;

a second temple piece coupled to said second side of said frame, said second temple piece having a length and including a first portion coupled to said frame and a second portion slidably engaged with said first portion; and means for adjusting both the length of said second temple piece and an angle of said second temple piece with respect to said line extending between said first side of said frame and said second side of said frame; and wherein said eyewear is fixed-temple eyewear.

25. The adjustable eyewear of claim 24, wherein each particular adjusted length of said first temple piece corresponds to a particular fixed angle of said first temple piece with respect to said line extending between said first side of said frame and said second side of said frame.

26. The adjustable eyewear of claim 24, wherein said first temple piece and said second temple piece are adjustable between a plurality of different discrete wear angles.

27. The adjustable eyewear of claim 24, wherein said means for adjusting both the length of said first temple piece and an angle of said first temple piece with respect to a line extending between said first side of said frame and said second side of said frame simultaneously adjusts the length of said first temple piece and said angle of said first temple piece.

28. Adjustable eyewear, comprising:

a frame having a first side and a second side;

a first temple piece including a first temple portion rigidly affixed to said first side of said frame and a second temple portion coupled to said first temple portion of said first temple piece, said first temple piece also including an adjustment mechanism capable of adjusting an angle of said second temple portion with respect to a line extending between said first side of said frame and said second side of said frame; and a second temple piece including a first temple portion rigidly affixed to said second side of said frame and a second temple portion coupled to said first temple portion of said second temple piece, said second temple piece also including an adjustment mechanism capable of adjusting an angle of said second temple portion with respect to said line extending between said first side of said frame and said second side of said frame; and wherein said eyewear is fixed-temple eyewear.

29. The adjustable eyewear of claim 28, wherein particular adjusted lengths of said first temple piece each correspond to a particular fixed angle of said first temple piece with respect to said line extending between said first side of said frame and said second side of said frame.

30. The adjustable eyewear of claim 28, wherein said first temple piece and said second temple piece are adjustable between a plurality of different discrete wear angles.

31. The adjustable eyewear of claim 28, wherein said adjustment mechanism of said first temple piece simultaneously adjusts a length of said first temple piece and said angle of said first temple piece.

* * * * *